(12) United States Patent
Komatsu et al.

(10) Patent No.: US 10,556,634 B2
(45) Date of Patent: Feb. 11, 2020

(54) BICYCLE CONTROL SYSTEM

(71) Applicant: Shimano Inc., Sakai, Osaka (JP)

(72) Inventors: Atsushi Komatsu, Osaka (JP); Shingo Sakurai, Osaka (JP); Yuta Kurokawa, Osaka (JP)

(73) Assignee: Shimano Inc., Osaka (JP)

( * ) Notice: Subject to any disclaimer, the term of this patent is extended or adjusted under 35 U.S.C. 154(b) by 174 days.

(21) Appl. No.: 15/641,855

(22) Filed: Jul. 5, 2017

(65) Prior Publication Data

US 2019/0009849 A1    Jan. 10, 2019

(51) Int. Cl.
*B62K 19/36* (2006.01)
*B62J 1/08* (2006.01)
*B62K 23/00* (2006.01)
*B62J 99/00* (2009.01)

(52) U.S. Cl.
CPC ............ *B62J 1/08* (2013.01); *B62J 2001/085* (2013.01); *B62J 2099/004* (2013.01); *B62J 2099/0026* (2013.01); *B62K 23/00* (2013.01)

(58) Field of Classification Search
CPC .................... B62J 1/08; B62J 2001/085; B62J 2099/0026; B62J 2099/004; B62K 23/00; B62K 19/36; B62K 25/04; G08C 17/00; H02J 1/14; B60L 50/20
See application file for complete search history.

(56) References Cited

U.S. PATENT DOCUMENTS

| | | | |
|---|---|---|---|
| 7,083,180 B2 | 8/2006 | Turner | |
| 8,091,910 B2 | 1/2012 | Hara et al. | |
| 8,429,061 B2 | 4/2013 | Shirai | |
| 8,458,080 B2 | 6/2013 | Shirai | |
| 8,550,551 B2 | 10/2013 | Shirai | |
| 8,651,212 B2* | 2/2014 | Vincenz | B62H 5/001 180/205.1 |
| 8,655,548 B2 | 2/2014 | Ichida et al. | |
| 8,781,690 B2* | 7/2014 | Hara | B62J 1/08 701/49 |
| 8,833,848 B2 | 9/2014 | Shirai | |
| 9,157,523 B2 | 10/2015 | Miki et al. | |
| 9,191,038 B2* | 11/2015 | Abe | G08C 17/00 |
| 9,284,016 B2* | 3/2016 | Takamoto | B62J 15/00 |
| 9,302,739 B2 | 4/2016 | Shirai | |
| 9,511,809 B2 | 12/2016 | Kodama et al. | |
| 9,561,734 B2 | 2/2017 | Watarai et al. | |

(Continued)

FOREIGN PATENT DOCUMENTS

| | | |
|---|---|---|
| DE | 10 2014 009 929 A1 | 1/2015 |
| DE | 10 2015 109 003 A1 | 12/2015 |
| DE | 10 2017 129 885 A1 | 6/2018 |

OTHER PUBLICATIONS

John Frorester, Basic Skills: Posture, Pedaling, and Maneuvering, 2012, IEEE, pg. 1-21 (Year: 2012).*

(Continued)

*Primary Examiner* — Mcdieunel Marc
(74) *Attorney, Agent, or Firm* — Global IP Counselors, LLP

(57) ABSTRACT

A bicycle control system is basically provided with an electronic controller. The electronic controller is configured to control at least one of an electric indicator and an electric actuator of a height adjustable seatpost in accordance with a condition of a battery to supply electricity to the electric actuator.

18 Claims, 17 Drawing Sheets

(56) References Cited

U.S. PATENT DOCUMENTS

| | | | | |
|---|---|---|---|---|
| 10,086,708 | B2* | 10/2018 | Ichida | B60L 58/13 |
| 10,363,986 | B2* | 7/2019 | Shirai | B62K 25/04 |
| 2011/0057485 | A1* | 3/2011 | Shirai | B62J 1/08 |
| | | | | 297/199 |
| 2011/0257848 | A1* | 10/2011 | Shirai | B62K 19/36 |
| | | | | 701/49 |
| 2012/0253601 | A1* | 10/2012 | Ichida | B60L 58/13 |
| | | | | 701/37 |
| 2012/0253606 | A1* | 10/2012 | Takamoto | B62J 15/00 |
| | | | | 701/48 |
| 2013/0119634 | A1* | 5/2013 | Camp | B62J 1/08 |
| | | | | 280/287 |
| 2016/0159432 | A1* | 6/2016 | Nishikawa | B62M 6/50 |
| | | | | 701/22 |
| 2016/0280330 | A1 | 9/2016 | Hara | |
| 2017/0355412 | A1* | 12/2017 | Takeshita | B60L 50/20 |
| 2018/0183255 | A1* | 6/2018 | Shahana | H02J 1/14 |
| 2018/0186419 | A1* | 7/2018 | Shipman | B62J 1/08 |
| 2019/0009849 | A1* | 1/2019 | Komatsu | B62J 1/08 |
| 2019/0061852 | A1* | 2/2019 | Shirai | B62J 1/08 |
| 2019/0193800 | A1* | 6/2019 | Hara | B62J 1/06 |

OTHER PUBLICATIONS

Pete, Enjoy a More Comfortable E-Bike Ride with a Suspension Seatpost!, 2013, Internet. pg. 1-5 (Year: 2013).*

* cited by examiner

BICYCLE CONTROL SYSTEM

BACKGROUND

Field of the Invention

This invention generally relates to a bicycle control system. More specifically, the present invention relates to a bicycle control system for a height adjustable seatpost.

Background Information

A bicycle seat is normally supported on a bicycle frame by a seatpost that is telescopically disposed in the seat tube of the bicycle frame. The height of the bicycle seat with respect to the bicycle frame is typically adjusted by changing an insertion amount of the seatpost in the seat tube of the bicycle frame. The upper end of the seat tube is typically provided with a longitudinal slit and a clamping arrangement that adjusts the diameter of the upper end of the seat tube to squeeze the seatpost for securing the seatpost in the desired position with respect to the bicycle frame. Recently, seatpost have been proposed that various adjustment mechanism in order to adjust the height of the seat. In some conventional mechanical bicycle seatpost adjustment mechanisms, a manual lever is provided for changing the seat height using a piston type telescopic tube arrangement such as disclosed in U.S. Pat. No. 7,083,180. Also, motorized seatpost have been proposed for changing the seat height such as disclosed in U.S. Pat. No. 9,511,809. In the case of a motorized seatpost, an electrical power supply such as a battery and/or a generator is provided for supply electrical energy (electricity) to the motorized seatpost.

SUMMARY

Generally, the present disclosure is directed to various features of a bicycle control system for adjusting a height of a height adjustable seatpost. In one feature, a bicycle control system is provided in which a height of a height adjustable seatpost is changed in accordance with a condition of a battery that supplies electricity to an electric actuator of the height adjustable seatpost.

In view of the state of the known technology and in accordance with a first aspect of the present disclosure, a bicycle control system is provided that basically comprises an electronic controller. The electronic controller is configured to control at least one of an electric indicator and an electric actuator of a height adjustable seatpost in accordance with a condition of a battery to supply electricity to the electric actuator.

With the bicycle control system according to the first aspect, it is possible to provide a suitable state of a height adjustable seatpost before a battery to supply electricity to an electric actuator is run out.

In accordance with a second aspect of the present invention, the bicycle control system according to the first aspect is configured so that the electronic controller is configured to output a signal related to a changing operation of a height of the height adjustable seatpost in accordance with an amount related to a remaining power of the battery.

With the bicycle control system according to the second aspect, it is possible to directly or indirectly change a height of a height adjustable seatpost to a suitable height in accordance with a remaining power of a battery.

In accordance with a third aspect of the present invention, the bicycle control system according to the first or second aspect is configured so that the electronic controller is configured to automatically control the at least one of the electric indicator and the electric actuator upon determining an amount related to a remaining power of the battery has reached a threshold.

With the bicycle control system according to the third aspect, it is possible to automatically change a height of a height adjustable seatpost or indicate a battery condition.

In accordance with a fourth aspect of the present invention, the bicycle control system according to the third aspect is configured so that the electronic controller is configured to set a first setting mode in which a user can set the threshold.

With the bicycle control system according to the fourth aspect, it is possible for a user to change a threshold in accordance with own demand.

In accordance with a fifth aspect of the present invention, the bicycle control system according to the third or fourth aspect is configured so that the threshold is set to a value correspond to the condition of the battery where the value is less than 20% of fully charged condition.

With the bicycle control system according to the fifth aspect, it is possible to provide a suitable state of a height adjustable seatpost before a battery to supply electricity to an electric actuator is nm out.

In accordance with a sixth aspect of the present invention, the bicycle control system according to any one of the first to fifth aspects is configured so that the electronic controller is configured to actuate the electric actuator of the height adjustable seatpost, and the electronic controller is configured to enter a selection mode, in which a user input selects whether the electronic controller actuates the electric actuator, upon determining a value related to a remaining power of the battery reached the threshold.

With the bicycle control system according to the sixth aspect, it is possible for a user to avoid unnecessary change of a height of a height adjustable seatpost in accordance with a battery condition.

In accordance with a seventh aspect of the present invention, the bicycle control system according to the sixth aspect is configured so that the electronic controller is configured to actuate the electric actuator only upon receiving the user input to accept an actuation of the electric actuator in the selection mode.

With the bicycle control system according to the seventh aspect, it is possible for a user to avoid unnecessary change of a height of a height adjustable seatpost in accordance with a battery condition.

In accordance with an eighth aspect of the present invention, the bicycle control system according to the sixth or seventh aspect is configured so that the electronic controller is configured to not actuate the electric actuator anymore in accordance with the condition of the battery after the selection of the user unless the electronic controller determines that the battery is charged over a reset threshold.

With the bicycle control system according to the eighth aspect, it is possible to avoid unnecessary change of a height of height adjustable seatpost after a selection of a user in a selection mode.

In accordance with a ninth aspect of the present invention, the bicycle control system according to any one of the first to eighth aspects is configured so that the electronic controller is configured to actuate the electric actuator to open a fluid port of a fluid passage.

With the bicycle control system according to the ninth aspect, it is possible to urge a user to change a height of a height adjustable seatpost.

In accordance with a tenth aspect of the present invention, the bicycle control system according to any one of the first to ninth aspects is configured so that the electronic controller is configured to actuate the electric actuator to adjust the height of the height adjustable seatpost to a predetermined height.

With the bicycle control system according to the tenth aspect, it is possible to change a height of a height adjustable seatpost to a suitable height without selection of a height by a user.

In accordance with an eleventh aspect of the present invention, the bicycle control system according to the tenth aspect is configured so that the electronic controller is configured to set a second setting mode in which a user can set the predetermined height.

With the bicycle control system according to the eleventh aspect, it is possible to set a preferable height of a height adjustable seatpost for a user in a situation where a battery is running low.

In accordance with a twelfth aspect of the present invention, the bicycle control system according to the tenth or eleventh aspect is configured so that the electronic controller is configured to set the predetermined height to an intermediate height between a maximum height of the height adjustable seatpost and a minimum height of the height adjustable seatpost.

With the bicycle control system according to the twelfth aspect, it is possible to provide an acceptable height of a height adjustable seatpost for both ascending and descending road conditions.

In accordance with a thirteenth aspect of the present invention, the bicycle control system according to any one of the first to twelfth aspects is configured so that the electronic controller is configured to control the electric indicator to indicate the electric actuator would be actuated before the electric actuator is actuated in accordance with the condition of the battery.

With the bicycle control system according to the thirteenth aspect, it is possible to avoid careless sudden change of a height of a height adjustable seatpost.

In accordance with a fourteenth aspect of the present invention, the bicycle control system according to the thirteenth aspect is configured so that the electronic controller is configured to control the electric indicator to indicate a movement direction of the height adjustable seatpost.

With the bicycle control system according to the fourteenth aspect, it is possible to notify a user of a movement direction before movement of a height adjustable seatpost.

In accordance with a fifteenth aspect of the present invention, the bicycle control system according to any one of the first to fourteenth aspects is configured so that the electronic controller is configured to not actuate the actuator in accordance with the condition of the battery anymore after the electric actuator is actuated unless the battery is charged over a reset threshold.

With the bicycle control system according to the fifteenth aspect, it is possible to avoid unnecessary change of a height of a height adjustable seatpost after actuation of an actuator of the height adjustable seatpost in accordance with a battery condition.

In accordance with a sixteenth aspect of the present invention, the bicycle control system according to any one of the first to fifteenth aspects is configured so that the electronic controller is configured to control the electric indicator to urge a user to adjust the height of the seat of the height adjustable seatpost to a proposed state of the height adjustable seatpost that is indicated by the electric indicator.

With the bicycle control system according to the sixteenth aspect, it is possible to indirectly change a height of a height adjustable seatpost to a suitable height in accordance with a remaining power of a battery.

In accordance with a seventeenth aspect of the present invention, the bicycle control system according to the sixteenth aspect is configured so that the electronic controller is configured to control the electric indicator in at least one of a continuous manner and an intermittent manner until a user input to change the height of the height adjustable seatpost is received.

With the bicycle control system according to the seventeenth aspect, it is possible to positively ensure that the user is urged to change a height of a height adjustable seatpost assembly.

In accordance with an eighteenth aspect of the present invention, the bicycle control system according to the sixteenth or seventeenth aspect is configured so that the electronic controller is configured to not control the electric indicator to urge the user anymore in accordance with the condition of the battery after the change of the height of the height adjustable seatpost unless the electronic controller determines the battery is charged over a reset threshold.

With the bicycle control system according to the eighteenth aspect, it is possible to avoid unnecessary urging control of an indicator after a change of a height of a height adjustable seatpost.

In accordance with a nineteenth aspect of the present invention, the bicycle control system according to any one of the first to eighteenth aspects is configured so that the battery is configured to supply electricity to another bicycle electric component.

With the bicycle control system according to the nineteenth aspect, it is possible to share a battery with another bicycle electric component.

In accordance with a twentieth aspect of the present invention, the bicycle control system according to the nineteenth aspect is configured so that the battery is configured to be detachably and selectively connected to one of the height adjustable seatpost and a bicycle electric component other than the height adjustable seatpost.

With the bicycle control system according to the twentieth aspect, it is possible to use a battery of another bicycle electric component for a height adjustable seatpost, and vice versa.

Also other objects, features, aspects and advantages of the disclosed bicycle control system will become apparent to those skilled in the art from the following detailed description, which, taken in conjunction with the annexed drawings, discloses several embodiments of the bicycle control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
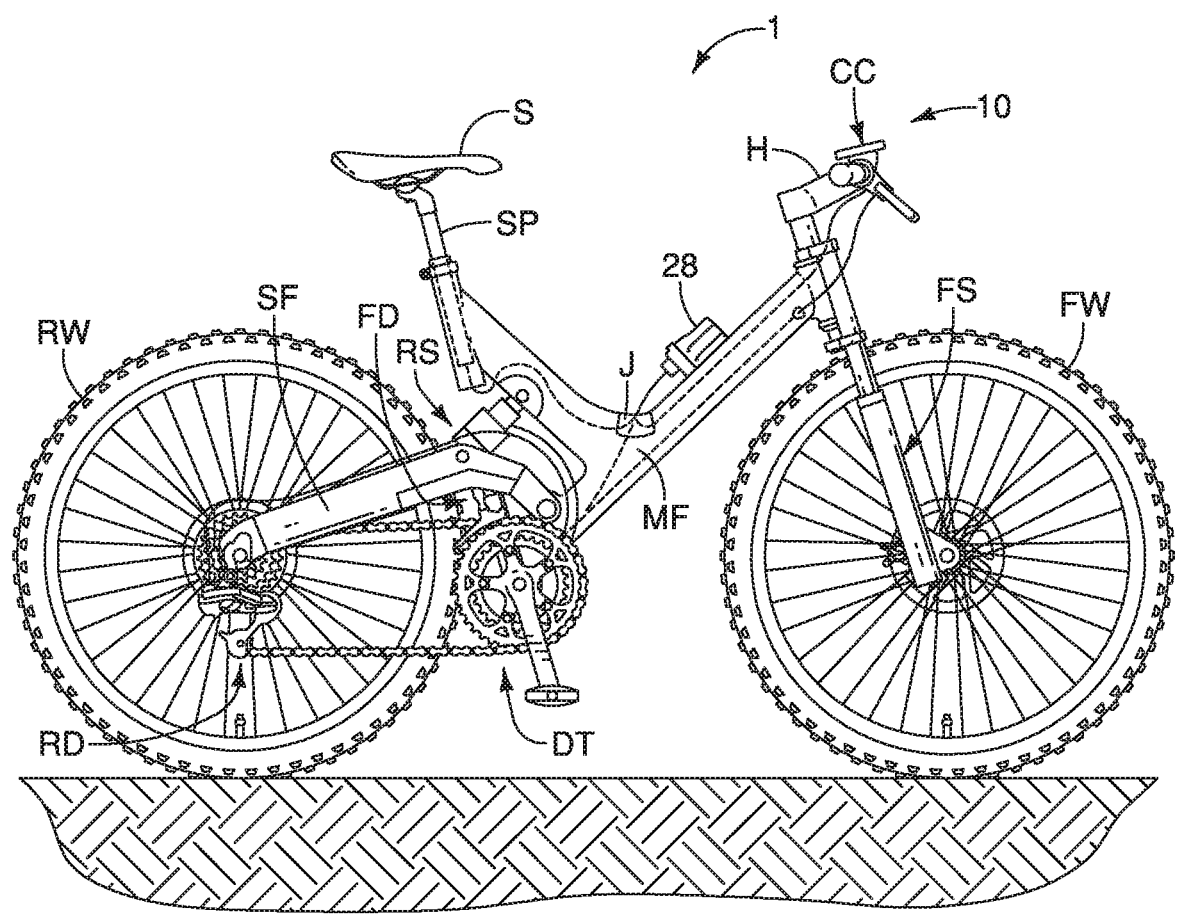
FIG. 1 is a side elevational view of a bicycle that is equipped with a bicycle control system having a height adjustable seatpost in accordance with one illustrated embodiment.
Figure 2:
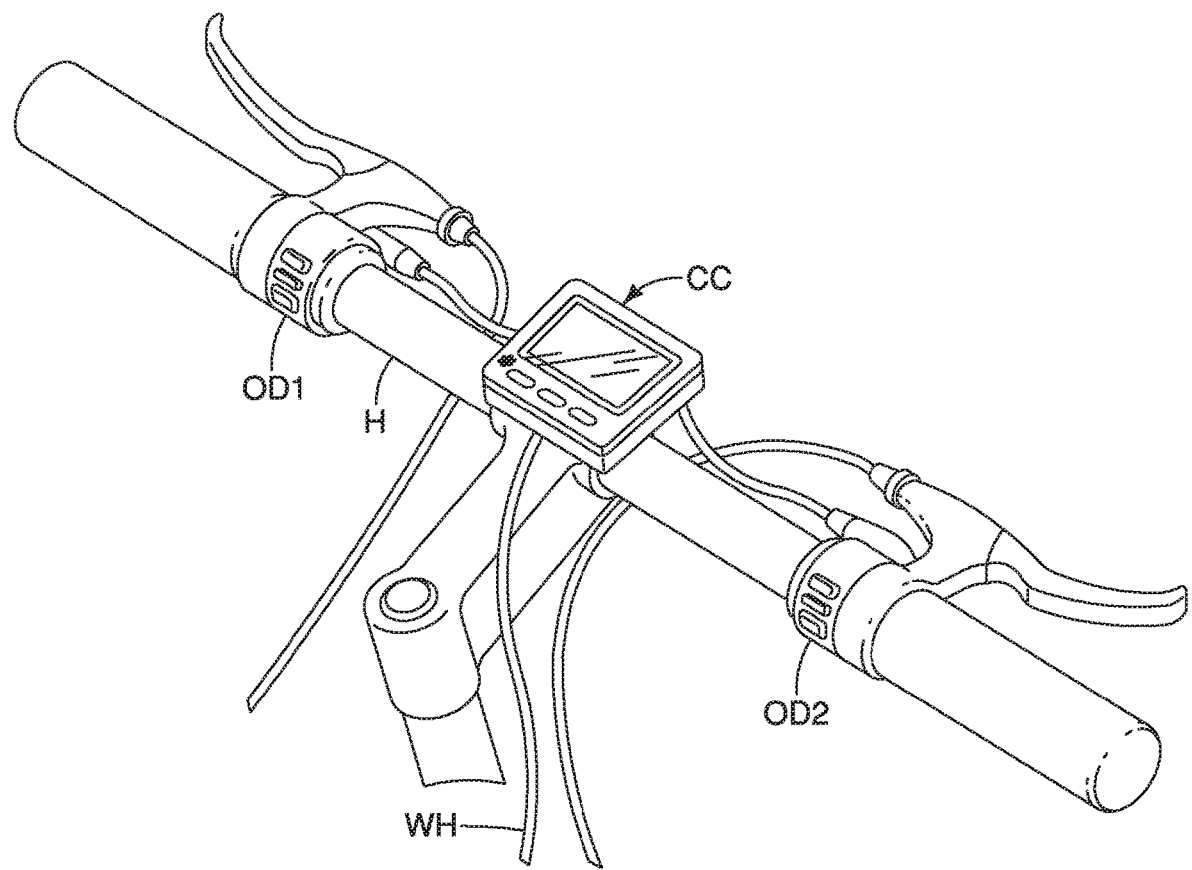
FIG. 2 is a perspective view of a handlebar area of the bicycle illustrated in FIG. 1, in which the bicycle control system is mounted to a straight type handlebar.
Figure 3:
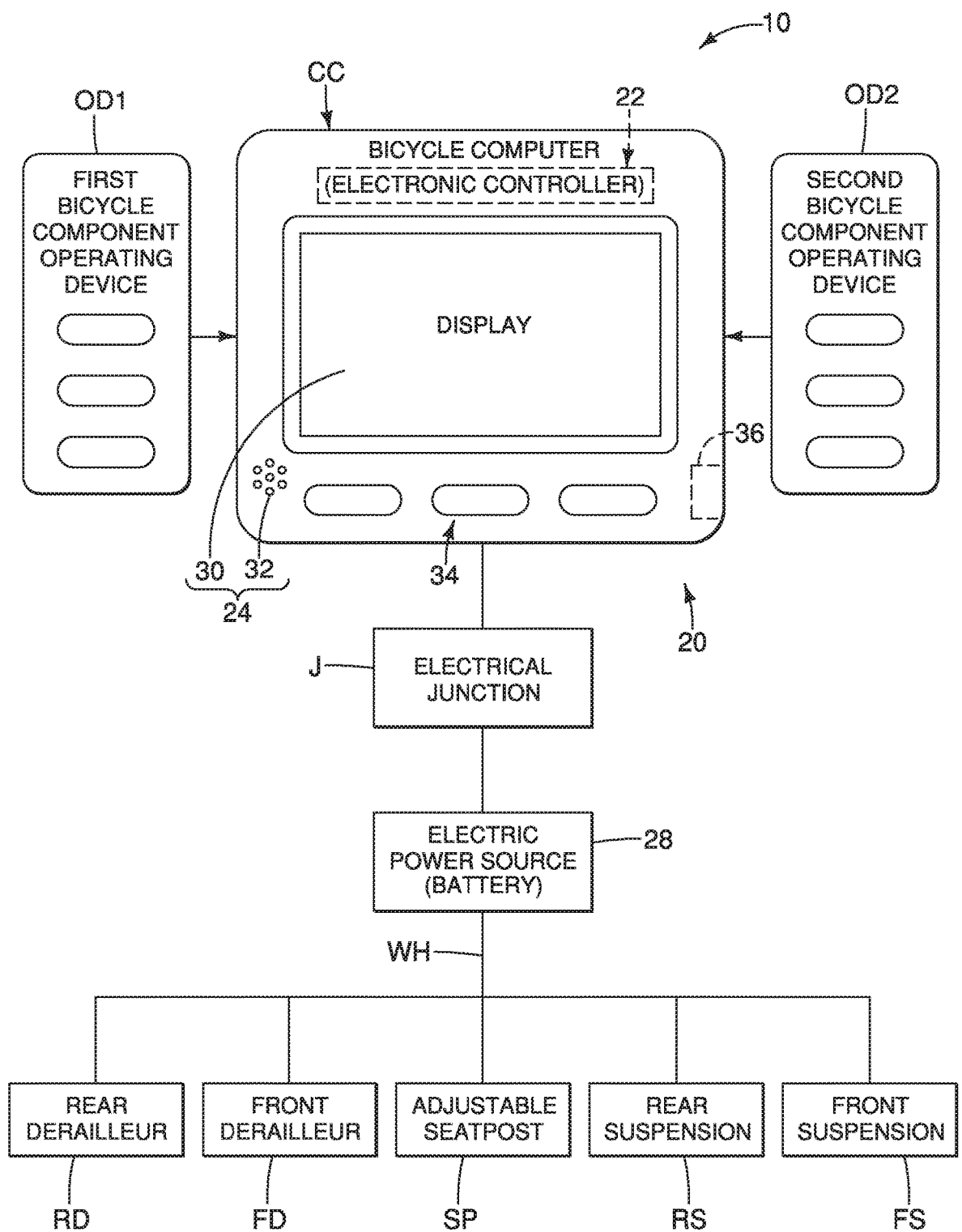
FIG. 3 is a schematic block diagram showing an entire configuration of the bicycle control system.

Referring initially to FIGS. 1 to 3, a bicycle 1 is illustrated that is equipped with a bicycle electric component system 10 in accordance with a first embodiment. While the bicycle 1 is illustrated as a mountain bike, the bicycle electric component system 10 can be used with other styles of bicycles. The bicycle electric component system 10 is configured to control the operations of various electrical bicycle components.

In the illustrated embodiment of FIGS. 1 and 2, the bicycle 1 includes, among other things, a handlebar a main bicycle frame MF, a sub-bicycle frame SF, a bicycle seat S, a front wheel FW, a rear wheel RW and a drive train DT. The drive train DT is configured to convert the rider's pedaling force into driving force. The bicycle 1 further includes other electric components that form a part of the bicycle electric component system 10. Specifically, the bicycle electric component system 10 comprises a bicycle computer CC, a height adjustable seatpost SP, a front suspension FS, a rear suspension RS, an electric front derailleur FD and an electric rear derailleur RD. The bicycle computer CC, the height adjustable seatpost SP, the front suspension FS, the rear suspension RS, the electric front derailleur FD and the electric rear derailleur RD are each bicycle components. Thus, the bicycle computer CC, the height adjustable seatpost SP, the front suspension FS, the rear suspension RS, the electric front derailleur FD and the electric rear derailleur RD can be collectively referred to as the bicycle components CC, SP, FS, RS, FD and RD. The bicycle 1 is provided with a first bicycle component operating device OD1 and a second bicycle component operating device OD2 for selectively operating, adjusting and/or changing the bicycle components SP, FS, RS, FD and RD. In other words, the first and second bicycle component operating devices OD1 and OD2 can be set by the user or rider to operate, adjust and/or change one or more of the bicycle components SP, FS, RS, FD and RD. For example, the first and second bicycle component operating devices OD1 and OD2 can be set to normally operate the electric front derailleur FD and the electric rear derailleur RD, respectively. However, through one or more operations of the interface 28 of the bicycle computer CC, the user or rider can temporarily change the first and second bicycle component operating devices OD1 and OD2 such that they can operate, adjust and/or change the front suspension FS and the rear suspension RS, respectively. Likewise, the user or rider can temporarily change one of the first and second bicycle component operating devices OD1 and OD2 such that it can operate, adjust and/or change the height adjustable seatpost SP.

Figure 4:
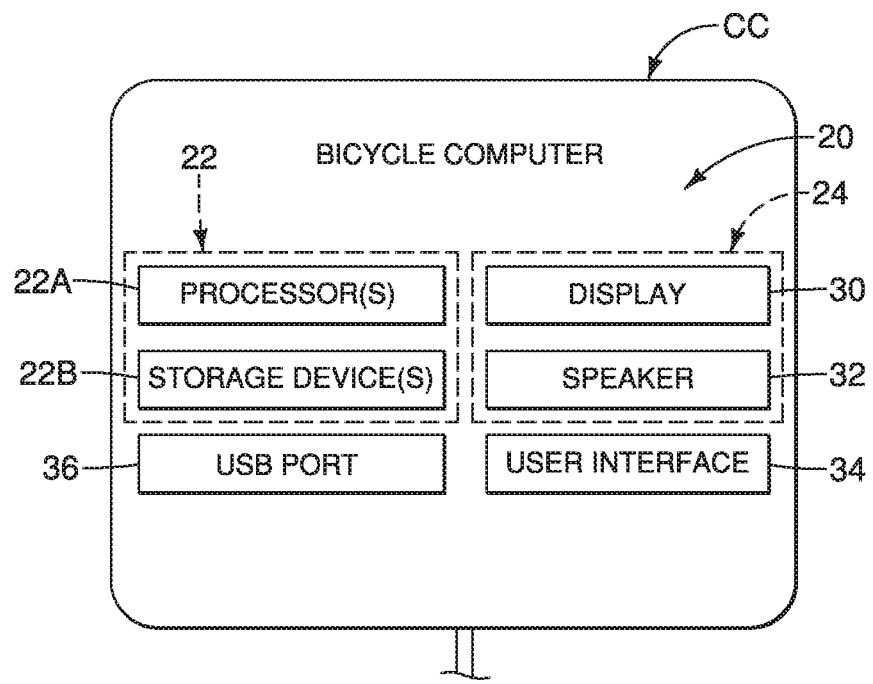
FIG. 4 is a schematic block diagram showing a basic configuration of a bicycle computer of the bicycle control system.

Selected portions of the bicycle electric component system 10 define a bicycle control system 20. Basically, as seen in FIGS. 3 and 4, the bicycle control system 20 comprises an electronic controller 22. Here, the first embodiment, the electronic controller 22 is a part of the bicycle computer CC. However, the electronic controller 22 can be a separate electronic controller that is dedicated to just the height adjustable seatpost SP. Also, the electronic controller 22 can be provided to an electric operating device to operate the height adjustable seatpost SP. The bicycle control system 20 further comprises the height adjustable seatpost SP.

As explained later, the electronic controller 22 is configured to control at least one of an electric indicator 24 and an electric actuator 26 of the height adjustable seatpost SP in accordance with a condition of a battery 28 to supply electricity to the electric actuator 26. The condition of a battery 28 is preferably a remaining power of the battery 28. Thus, for example, the electronic controller 22 is configured to output a signal related to a changing operation of a height of the height adjustable seatpost SP in accordance with an amount related to a remaining power of the battery 28. The remaining battery capacity is a measurement of the state-of-charge (SOC) of the battery 28. In other words, the SOC of the battery 28 is an amount of the remaining capacity of the battery 28. The SOC of the battery 28 can be measured using any known methodology including but not limited to, the terminal voltage method, the impedance method and the discharging method. The bicycle control system 20 allows the rider to manually change the height of the seat S by operating one of the first and second bicycle component operating devices OD1 and OD2 that is assigned to the adjusting in the height adjustable seatpost SP. Moreover, as mentioned, the bicycle control system 20 is programmed to selectively (1) change the height of the height adjustable seatpost SP upon the remaining power of the battery 28 reaching a threshold; and/or (2) notified or urge a rider to change the height of the height adjustable seatpost SP upon the remaining power of the battery 28 reaching a threshold.

Here, a wiring junction J is provided for interconnecting the battery 28 to each of the bicycle electrical components CC, SP, FS, RS, FD and RD via an electrical cable. In this way, the battery 28 supplies electricity to the bicycle electrical components CC, SP, FS, RS, FD and RD. The wiring junction J can be remote from the bicycle electrical components CC, SP, FS, RS, FD and RD or provided on one of the bicycle electrical components CC, SP, FS, RS, FD and RD. As seen in FIG. 3, the bicycle electrical components CC, SP, FS, RS, FD and RD communicate uses power line communications (PLC) such as used in the Dig electrical components sold by Shimano Inc. Alternatively, wireless communication devices or dedicates signal lines can be used to communicate between the bicycle electrical components CC, SP, FS, RS, FD and RD.

Here, the illustrated embodiment of FIGS. 1 to 16, the electronic controller 22 is a part of the bicycle computer CC. For example, as seen in FIGS. 2 and 3, the electric indicator 24 includes a display 30 (i.e., a visual indicator) and a speaker 32 (i.e., an audio indicator). Thus, the electronic controller 22 can control the display 30 and/or the speaker 32 to notify the rider when the remaining power of the battery 28 as fallen below a prescribed threshold. Preferably, the bicycle computer CC is provided with a user interface 34 (e.g., buttons) that a user can operate to change various parameters or settings used by the control programs of the electronic controller 22. The bicycle computer CC is further provided with a USB port 36 for a user to hook up an external device such as a tablet, a smartphone, a laptop computer, a desktop computer, etc. In this way, the user can set whether the low battery level notification is output via the display 30 and/or the speaker 32.

As seen in FIG. 4, the electronic controller 22 is preferably a microcomputer that includes one or more processors 22A and one or more storage devices 22B (i.e., a computer memory device). The storage device 22B can be any one or more a non-transitory computer readable medium such as a ROM (Read Only Memory) device, a RAM (Random Access Memory) device, a hard disk, a flash drive, etc. The storage device 22B is configured to store settings, programs, data, calculations and/or results of the processor(s) 22A.

While the present disclosure focuses on the electronic controller 22 notifying and/or changing the height of the height adjustable seatpost SP, the electronic controller 22 can also perform other control functions of the bicycle 1. For example, the electronic controller 22 is a dedicated master controller that communicates with each slave controller of the bicycle components FS, RS, FD and RD via the electrical power cables. However, the controller 40 can be provided on one of the bicycle electrical components CC, SP, FS, RS, FD and RD instead of or in conjunction with the controllers that are provided on the bicycle electrical components CC, SP, FS, RS, FD and RD.

The battery 28 is configured to supply electricity to another electric bicycle component. For example, in the illustrated embodiment of FIGS. 1 and 3, the battery 28 is configured to supply electricity to actuators (not shown) of the front suspension FS, the rear suspension RS, the electric front derailleur FD and the electric rear derailleur RD.

Figure 6:
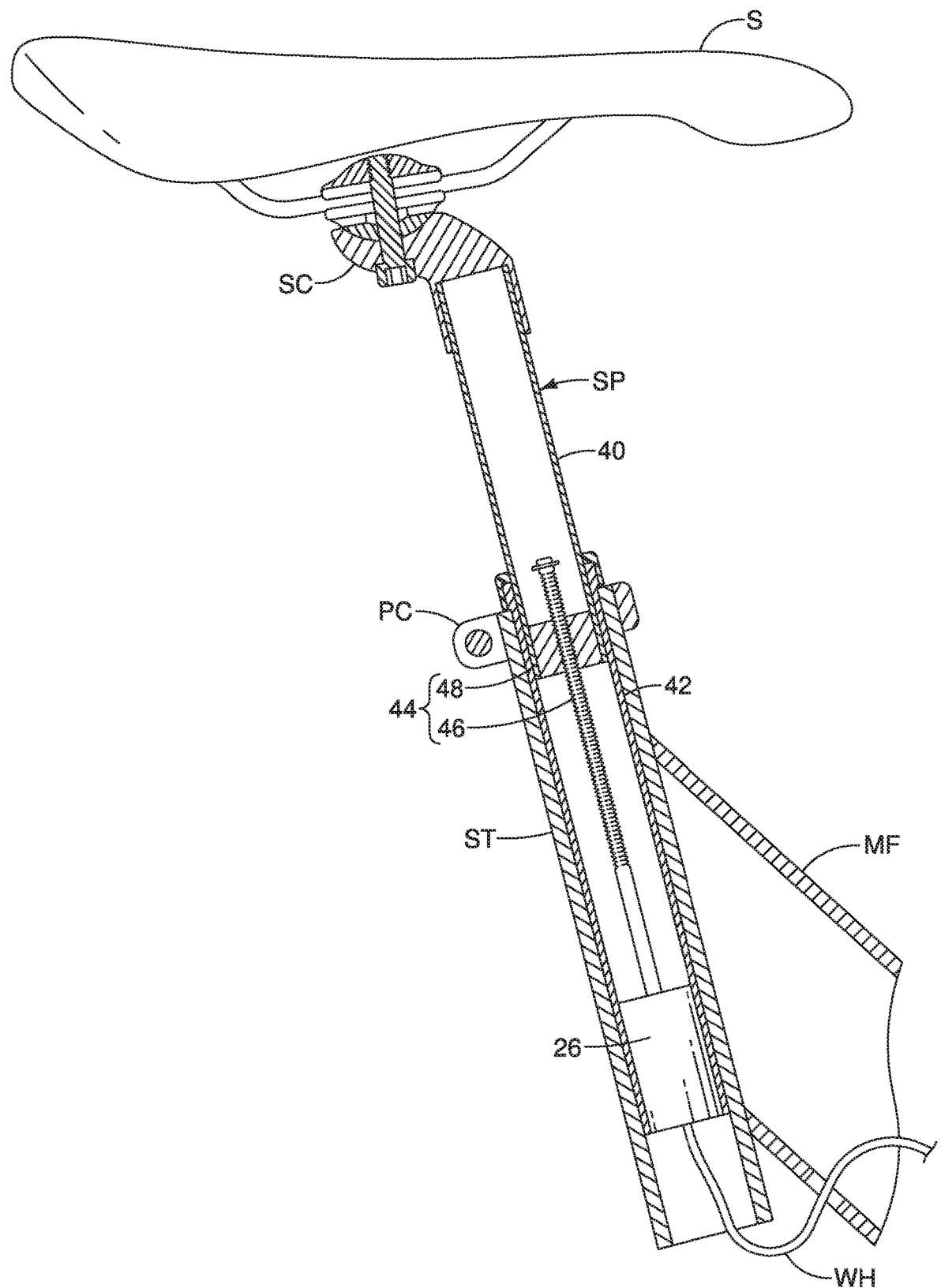
FIG. 6 is an enlarged longitudinal cross-sectional view of a portion of the bicycle illustrated in FIG. 1 that is equipped with the height adjustable seatpost.
Figure 7:
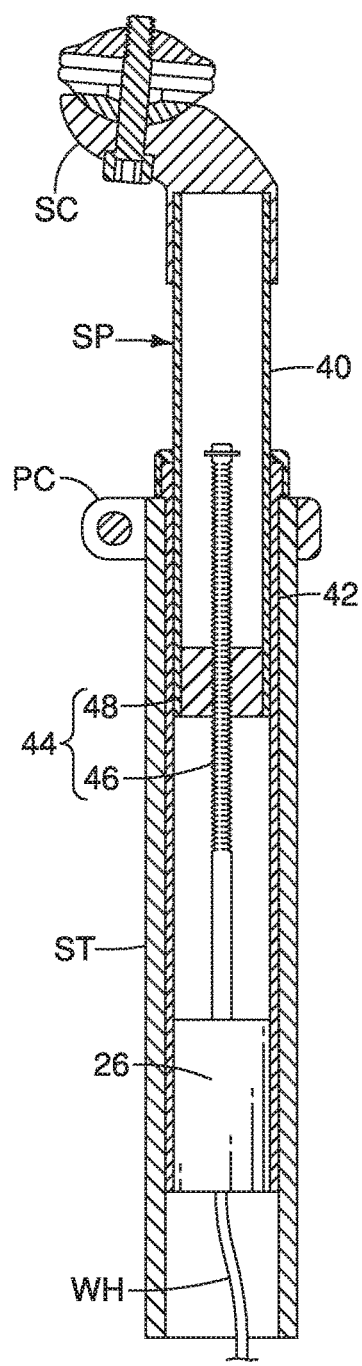
FIG. 7 is a longitudinal cross-sectional view of the height adjustable seatpost in a middle height position.
Figure 8:
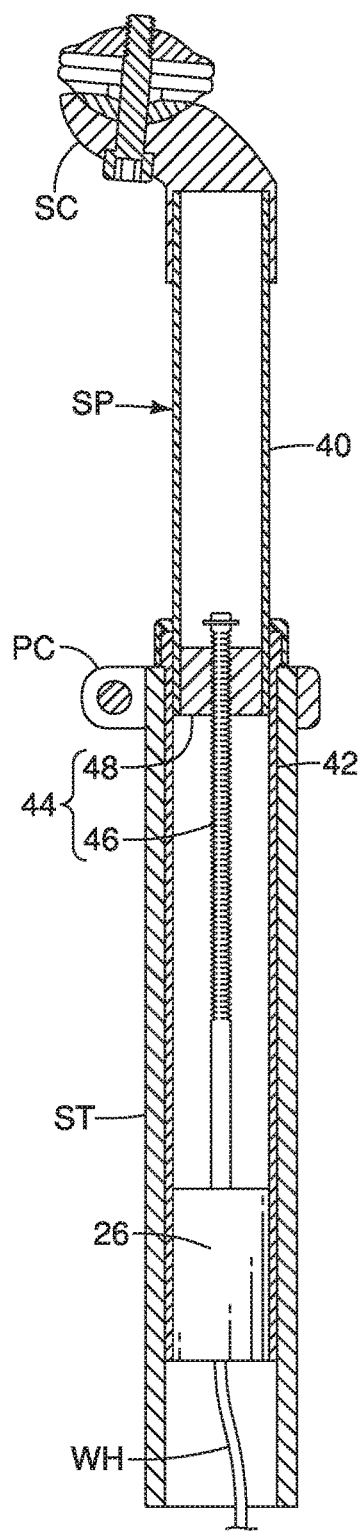
FIG. 8 is a longitudinal cross-sectional view of the height adjustable seatpost in a high height position.
Figure 9:
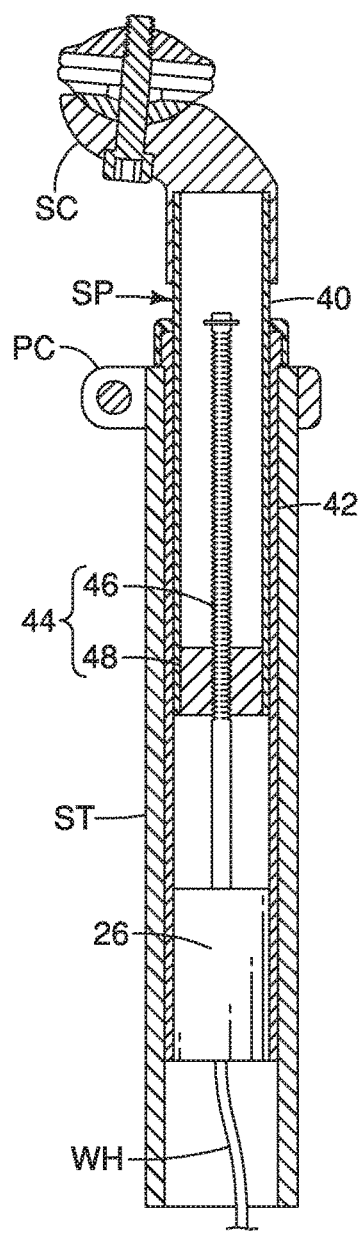
FIG. 9 is a longitudinal cross-sectional view of the height adjustable seatpost in a low height position.

As seen in FIGS. 6 to 9, the height adjustable seatpost SP is a motorized seatpost for automatically or manually adjusting a seat height of the bicycle seat S with respect to the main bicycle frame MF. In addition to the electric actuator 26, the height adjustable seatpost SP further includes an inner (first) tube 40, an outer (second) tube 42 and a height adjustment device 44. In general, the inner and outer tubes 40 and 42 are telescopically arranged, with the amount of insertion of the inner tube 40 into the outer tube 42 being adjustable. Thus, the inner and outer tubes 40 and 42 concentrically arranged as seen in the illustrated embodiment as seen in FIG. 6.

In the illustrated embodiment, the inner and outer tubes 40 and 42 are a separate unit from the main bicycle frame MF such that the outer tube 42 is easily installed into a seat tube ST of the main bicycle frame MF as seen in FIG. 6. The inner tube 40 has a seat clamp SC on its upper end for attaching the seat S in a conventional manner. The outer tube 42 is secured to the seat tube ST of the main bicycle frame MF by a conventional clamping arrangement PC that is provided on the upper end of the seat tube ST. The height adjustment device 44 operatively connects the inner and outer tubes 40 and 42 together for selectively extending (raising) and retracting (lowering) the inner tube 40 with respect to the outer tube 42 based on a motor control signal from an operating switch of one of the operating devices OD1 and OD2 via the electronic controller 22.

In the illustrated embodiment, the height adjustment device 44 mainly includes a drive screw 46 and a screw nut 48 that form a linear movement mechanism. The screw nut 48 is threadedly engaged with the drive screw 46 such that the screw nut 48 moves in an axial direction of the drive screw 46 in response to relative rotational movement between the drive screw 46 and the screw nut 48. Of course, other types of linear movement mechanisms can be used as needed and/or desired.

Figure 5:
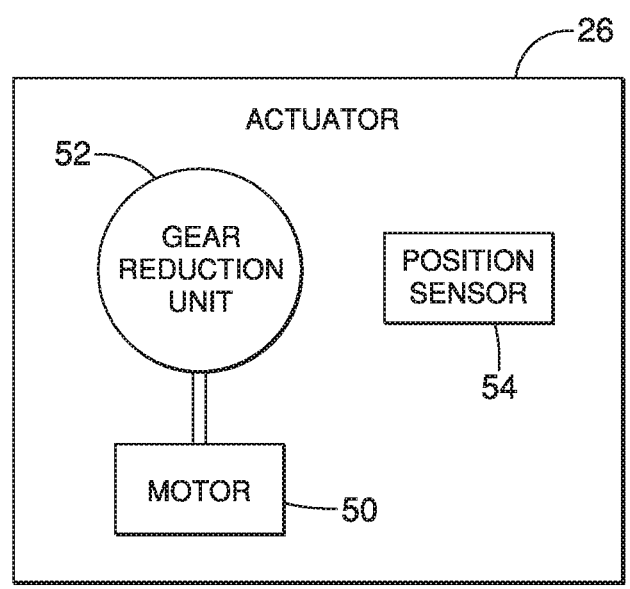
FIG. 5 is a schematic block diagram showing a basic configuration of each bicycle component of the bicycle control system that is operated based on signals or commands from the bicycle computer of the bicycle control system.

As seen in FIG. 5, the electric actuator 26 of the height adjustable seatpost SP basically includes a motor 50, a gear reduction unit 52 and a position sensor 54. In this illustrated embodiment, the motor 50 is a reversible electric motor that is rigidly secured to the lower end of the outer tube 42. Reversible electric motors such as the motor 50, are well known, and thus, the motor 50 will not be discussed and/or illustrated in detail. The gear reduction unit 52 reduces the rotational speed of the motor 50 while maintaining a constant output torque. In this way, the gear reduction unit 52 transfers the rotation of the motor 50 to the height adjustment device 44 at a lower speed and a higher torque. Gear reduction units, such as the gear reduction unit 52, are well known, and thus, the gear reduction unit 52 will not be discussed and/or illustrated in detail.

In the illustrated embodiment, the position sensor 54 is an electro-mechanical device that converts the angular position of a shaft, axle, gear or other rotating part of the motor 50 to an analog or digital position signal that is sent to the electronic controller 22. The position sensor 54 is, for example, a rotary encoder that detects a rotation amount of an output shaft of the motor 50. Using feedback control based on the position signal from the position sensor 54, the electronic controller 22 sends an operating signal to the motor 50 for controlling the operation (rotation) of the motor 50 to output a desired amount rotational movement to the height adjustment device 44 via the gear reduction unit 52. In this way, the electronic controller 22 can operate the height adjustment device 44 to obtain the desired seat position.

Figure 10:
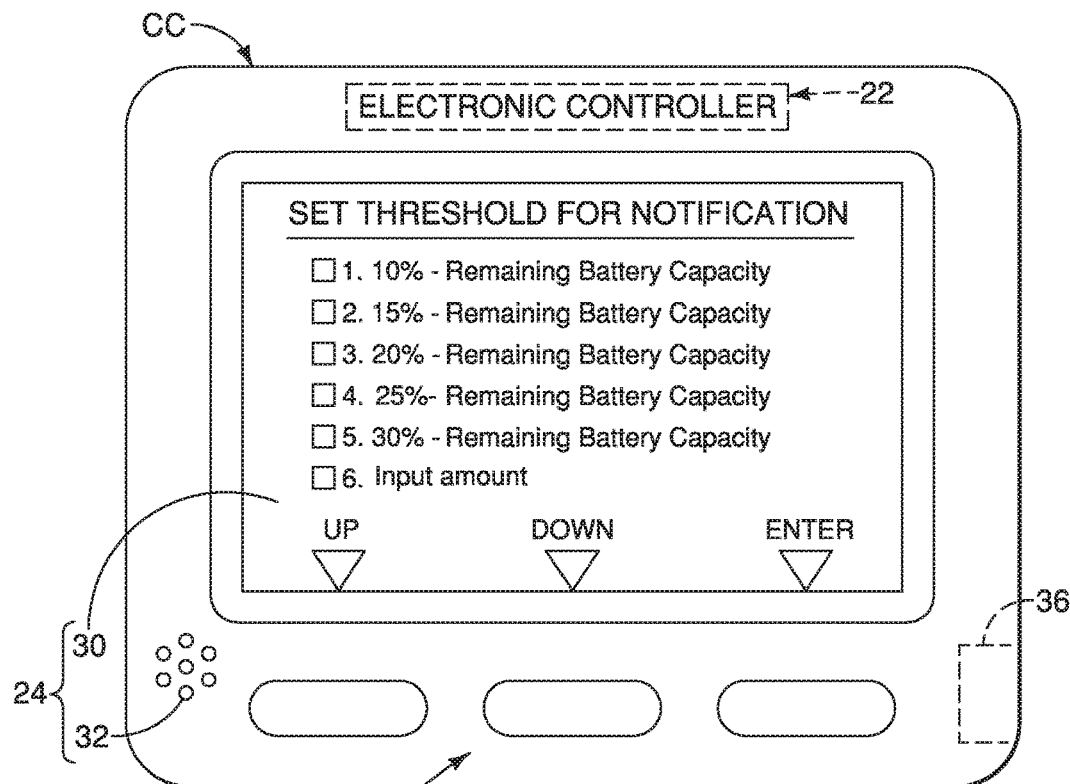
FIG. 10 is a front view of the bicycle computer displaying a screen (i.e., a first setting mode) for a rider or other user to set a threshold for the battery that is used to determine when to notify a rider of a low battery capacity.
Figure 11:
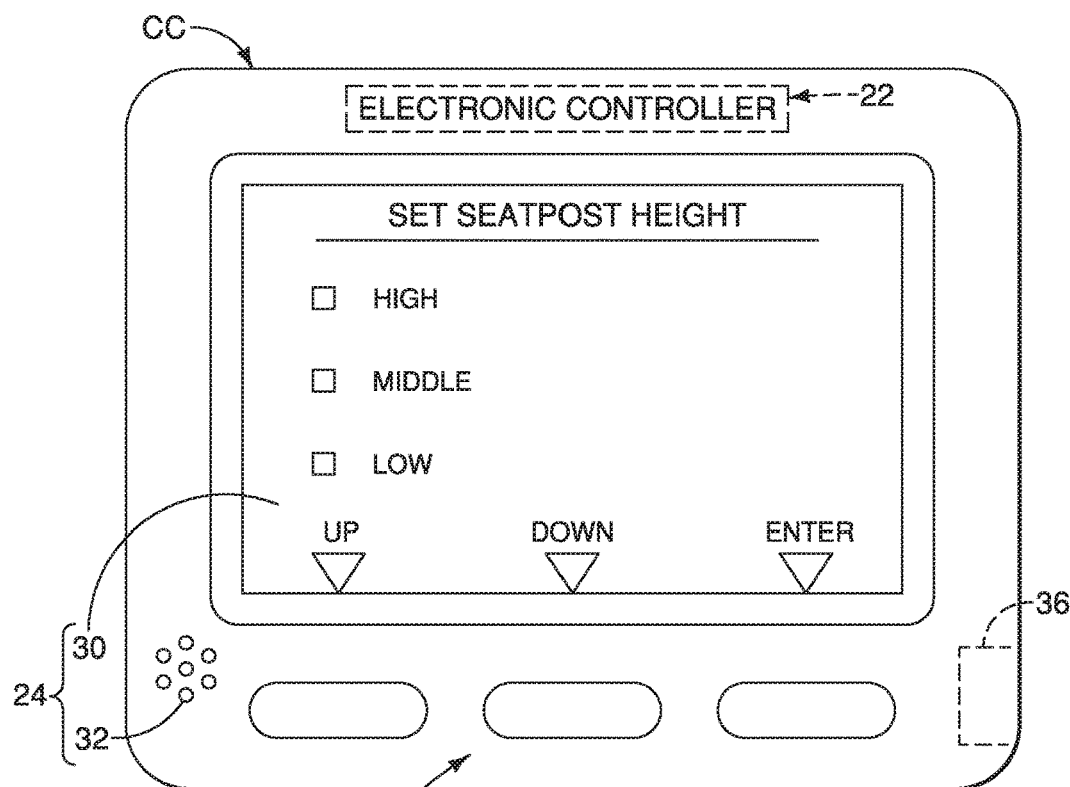
FIG. 11 is a front view of the bicycle computer displaying a screen (i.e., a second setting mode) for a rider or other user to set a predetermined seatpost height for the height adjustable seatpost upon determining the battery is below the threshold.
Figure 12:
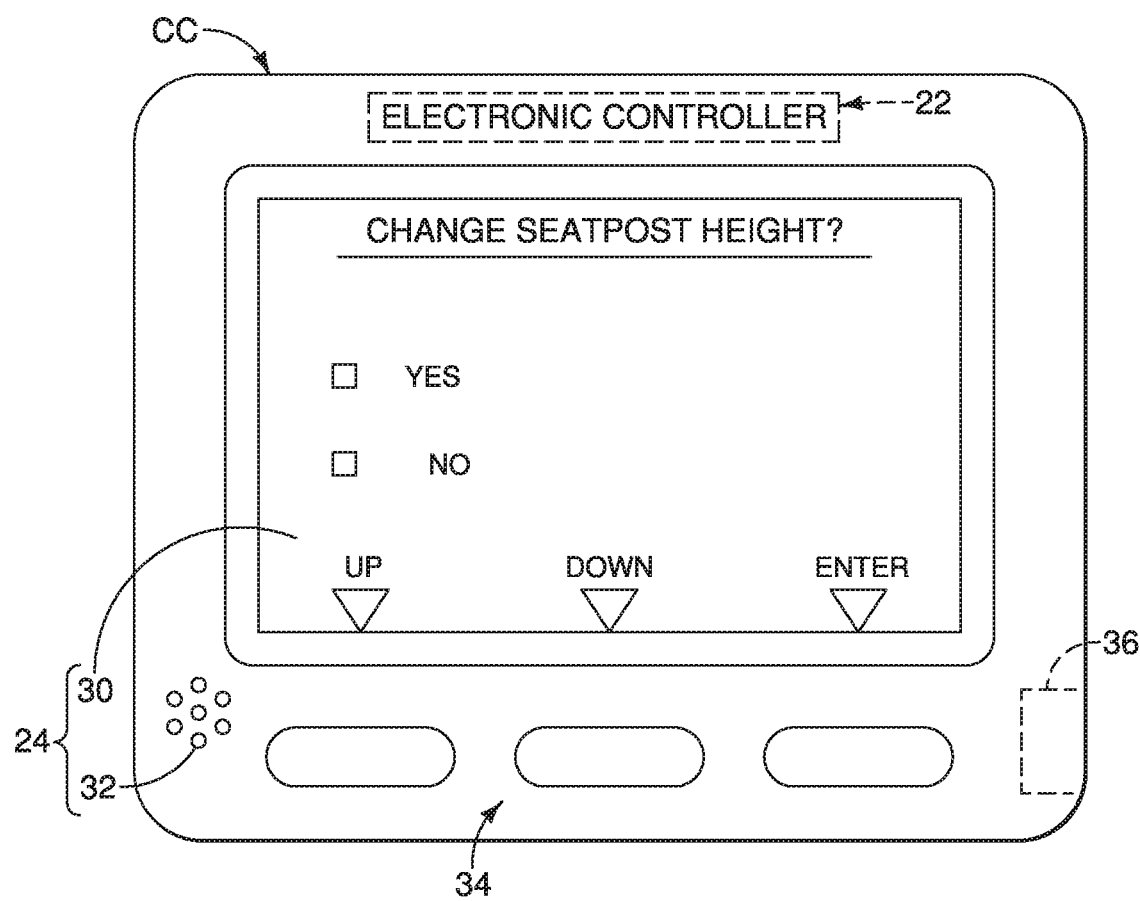
FIG. 12 is a front view of the bicycle computer displaying a screen for a rider to accept the seatpost height being changed to the predetermined seatpost height for the height adjustable seatpost after a determination that the battery is below the threshold.

Referring now to FIGS. 10 to 12, the storage device 22B of the electronic controller 22 is configured with a variety of user setting options or modes for carrying out a seat adjustment height process and/or a notification to change the seat height upon of a remaining capacity of the battery 28 falling below a threshold indicative of a low battery level of the battery 28. As explained below, the electronic controller 22 is configured to output a signal related to a changing operation of a height of the height adjustable seatpost SP in accordance with an amount related to a remaining power of the battery 28.

Referring to FIG. 10, the electronic controller 22 preferably includes a first setting mode which appears on the display 30. Typically, the electronic controller 22 will produce an audible sound when the screen shown in FIG. 10 is displayed on the display 30. In the first setting mode, the electronic controller 22 is programmed such that a user or rider via the user interface 34 can set the threshold. In other words, the electronic controller 22 is configured to set a first setting mode in which a user can set the threshold. Preferably, the user can enter the first setting mode at any time for setting the threshold. If the user or rider does not set the threshold, then the electronic controller 22 will use the factory default threshold setting or the prior user inputted threshold setting. As seen in FIG. 10, in the first setting mode, the user is preferably provided with a plurality of prescribed notification thresholds based on a remaining battery capacity ratio. Also, preferably, in the first setting mode, the user can input any desired amount for the remaining capacity of the battery 28 to act as the notification threshold.

Referring to FIG. 11, the electronic controller 22 preferably includes a second setting mode which appears on the display 30. Typically, the electronic controller 22 will produce an audible sound when the screen shown in FIG. 11 is displayed on the display 30. In the second setting mode, the electronic controller 22 is programmed such that a user or rider via the user interface 34 can set the predetermined height for the height adjustable seatpost SP that will be used upon determining the remaining capacity of the battery 28 has fallen below the threshold for notify of a low battery level and/or changing the height adjustable seatpost SP to the predetermined height. In this way, the electronic controller 22 is configured to set the second setting mode in which a user can set the predetermined height. Preferably, the user can enter into the second setting mode at any time for setting the predetermined height. Also, as explained later, the electronic controller 22 can be set to execute a prestored program that offers the rider an option to enter the predetermined height of the height adjustable seatpost SP upon determining the remaining capacity of the battery 28 has fallen below the threshold. If the user or rider does not set the predetermined height, then the electronic controller 22 will use the factory default predetermined height setting or the prior user inputted predetermined height setting.

Referring to FIG. 12, the electronic controller 22 preferable includes a selection mode which appears on the display 30 upon determining a value related to a remaining power of the battery 28 has reached the threshold for adjusting the height of the seat during a low battery level condition. Typically, the electronic controller 22 will produce an audible sound when the screen shown in FIG. 12 is displayed on the display 30. In the selection mode, the electronic controller 22 is programmed such that a user or rider can accept or decline a change in the height of the height adjustable seatpost SP upon determining the remaining capacity of the battery 28 has fallen below the threshold for changing the height adjustable seatpost SP to the predetermined height. Here, a user can operate the user interface 34 to select whether the electronic controller 22 actuates the electric actuator 26, or not, in the event the low battery level condition. In this way, the electronic controller 22 is configured to enter the selection mode, in which a user input selects whether the electronic controller 22 actuates the electric actuator 26, upon determining a value related to a remaining power of the battery 28 reached the threshold. If the user selects via the user interface 34 to proceed with the change of the height adjustable seatpost SP to the predetermined height, then the electronic controller 22 actuates the electric actuator 26 to change the height of the height adjustable seatpost SP. In this way, the electronic controller 22 is configured to actuate the electric actuator 26 only upon receiving the user input to accept an actuation of the electric actuator 26 in the selection mode. Alternatively, the electronic controller 22 can be configured to automatically actuate the electric actuator 26 to change the height of the height adjustable seatpost without receiving the user input in the selection mode for predetermined period, unless the electronic controller 22 receives the user input indicative of not accepting the actuation of the electric actuator 26 in the selection mode.

FIGS. 13 to 16 illustrate several control programs that are stored in the storage device 22B. The user can select which one of the control programs will be used for any particular riding condition. Preferably, one of the control programs will be a default program that will be executed if one of the control programs is not selected by the user. Alternatively, the default can be that none of the control programs are executed until selected. As will be seen in FIGS. 13 to 16, the electronic controller 22 is configured to automatically control at least one of the electric indicator 24 and the electric actuator 26 upon determining an amount related to a remaining power of the battery 28 has reached a threshold.

Figure 13:
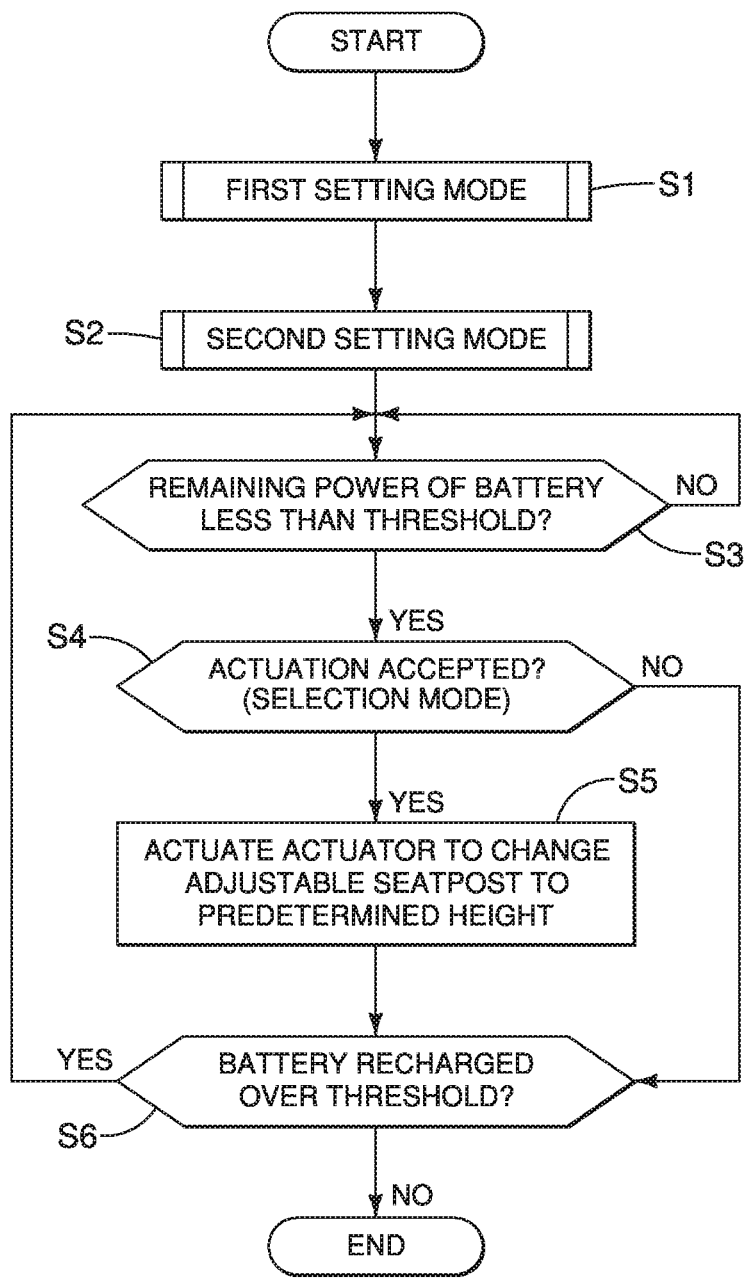
FIG. 13 is a flowchart showing a control process executed by an electronic controller of the bicycle control system for notifying a rider that the battery is below the threshold and changing the seatpost height of the height adjustable seatpost illustrated in FIGS. 6 to 9 to the predetermined seatpost height upon the rider inputting an acceptance to the changing in the seatpost height of the height adjustable seatpost to the predetermined seatpost height.

Referring to FIG. 13, a first low battery seat height mode will now be discussed. Using the user interface 34, the user or rider can select whether the electronic controller 22 will execute the first low battery seat height mode during riding. If the first low battery seat height mode is set run during riding, then the electronic controller 22 will execute the process of FIG. 13 at a prescribed interval. Basically, in the process of FIG. 13, the electronic controller 22 is configured to automatically control the electric actuator 26 upon determining an amount related to a remaining power of the battery 28 has reached a threshold. However, in this process of FIG. 13, the rider will also be given the option to cancel the automatic control of the electric actuator 26.

In step S1, the electronic controller 22 is configured to set a first setting mode in which a user can set the threshold. As mentioned above, this threshold is for actuating the actuator 26 to change the height of the height adjustable seatpost SP in view of the condition of the battery 28. An example of the first setting mode is illustrated in FIG. 10. Typically, the electronic controller 22 will produce an audible sound when the screen shown in FIG. 10 is displayed on the display 30. The screen display illustrated in FIG. 10 is displayed for a predetermined amount of time to allow the user to select one of the thresholds that were set in advance or to set a specific value for the threshold. As a default setting, the threshold is set to a value correspond to the condition of the battery 28 where the value is less than 20% of fully charged condition. If the user selects one of the thresholds or does nothing, then the electronic controller 22 will proceed to step S2. Step S1 can be omitted from the process. However, preferably, the user can set the threshold via the first setting mode at any time.

In step S2, the electronic controller 22 is configured to set a second setting mode in which a user can set the predetermined height. An example of the second setting mode is illustrated in FIG. 11. Typically, the electronic controller 22 will produce an audible sound when the screen shown in FIG. 11 is displayed on the display 30. The screen display illustrated in FIG. 11 is displayed for a predetermined amount of time to allow the user to select one of the predetermined heights that were set in advance. If the user selects one of the predetermined heights or does nothing, then the electronic controller 22 will proceed to step S3. Step S2 can be omitted from the process. However, preferably, the user can set the predetermined height at any time.

In step S3, the electronic controller 22 is programmed to determine if the remaining power of the battery 28 is less than the threshold. If the remaining power of the battery 28 has not reached the threshold, then the process repeats step S3 at a prescribed interval until the remaining power of the battery 28 reaches the threshold. Upon the remaining power of the battery 28 reaches the threshold, the process proceeds to step S4.

In step S4, the electronic controller 22 is configured to enter a selection mode, in which a user input selects whether the electronic controller 22 actuates the electric actuator 26, upon determining a value related to a remaining power of the battery 28 reached the threshold. Here, the electronic controller 22 displays the screen display illustrated in FIG. 12 for a predetermined amount of time to allow the user to accept or decline a change in the height of the height adjustable seatpost SP. Typically, the electronic controller 22 will produce an audible sound when the screen shown in FIG. 12 is displayed on the display 30. If the user declines the change in the height of the height adjustable seatpost SP, then the process proceeds to step S6. If the user accepts the change in the height of the height adjustable seatpost SP, then the process proceeds to step S5. If the user does nothing, then the electronic controller 22 will either automatically decline to change the height of the height adjustable seatpost SP based on a factory default setting. In this way, the electronic controller 22 is configured to actuate the electric actuator 26 only upon receiving the user input to accept an actuation of the electric actuator 26 in the selection mode. Preferably, the user can set the default setting to either automatically accept or automatically decline the change in the height of the height adjustable seatpost SP. Step S4 can be omitted from the process. Alternatively, or in addition to Step S4, the electronic controller 22 is configured to control the electric indicator 24 to indicate that the electric actuator 26 will be actuated before the electric actuator 26 is actuated in accordance with the condition of the battery 28. Preferably, the electronic controller 22 can be configured to control the electric indicator 24 to indicate a movement direction of the height adjustable seatpost SP before movement of the actuator to change a height of the height adjustable seatpost SP in step S5. For example, the electronic controller 22 can produce a first sound to indicate that the height of the height adjustable seatpost SP will increase, and a second sound that is different from the first sound to indicate that the height of the height adjustable seatpost SP will decrease. Alternatively, the electronic controller 22 can display an up arrow to indicate that the height of the height adjustable seatpost SP will increase, and a down arrow to indicate that the height of the height adjustable seatpost SP will decrease. However, the electronic controller 22 can be configured to control the electric actuator 26 to indicate only the actuation of the electric actuator 26 beforehand without any directional indication of the movement of the height adjustable seatpost SP.

In step S5, the electronic controller 22 is configured to actuate the electric actuator 26 of the height adjustable seatpost SP. In particular, the electronic controller 22 is configured to actuate the electric actuator 26 to adjust the height of the height adjustable seatpost SP to a predetermined height. As a default setting, the electronic controller 22 is configured to set the predetermined height to an intermediate height between a maximum height of the height adjustable seatpost SP and a minimum height of the height adjustable seatpost SP. Next, the process proceeds to step S6. Step S5 can be replaced to another Step S5' in which the electronic controller 22 is configured to actuate the electric actuator 26 to open a fluid port 62 of a fluid passage 60 (described later).

In step S6, the electronic controller 22 is configured to check if the battery has been recharged over the threshold. For example, one or both of the front and rear wheels FW and RW can be provided with a generator to recharge the battery 28. As an alternate example, the battery 28 can be detached from the bicycle control system 20 to be recharged. The electronic controller 22 is configured to not actuate the actuator in accordance with the condition of the battery 28 anymore after the electric actuator 26 is actuated unless FW battery 28 is charged over a reset threshold. If the battery 28 has been recharged over the reset threshold, then the process proceeds back to step S3. The reset threshold of step S6 can be the same as the threshold of step S3 or larger than the threshold of step S3. In this way, the electronic controller 22 is configured to not actuate the electric actuator 26 anymore in accordance with the condition of the battery 28 after the selection of the user unless the electronic controller 22 determines that the battery 28 is charged over a reset threshold.

Figure 14:
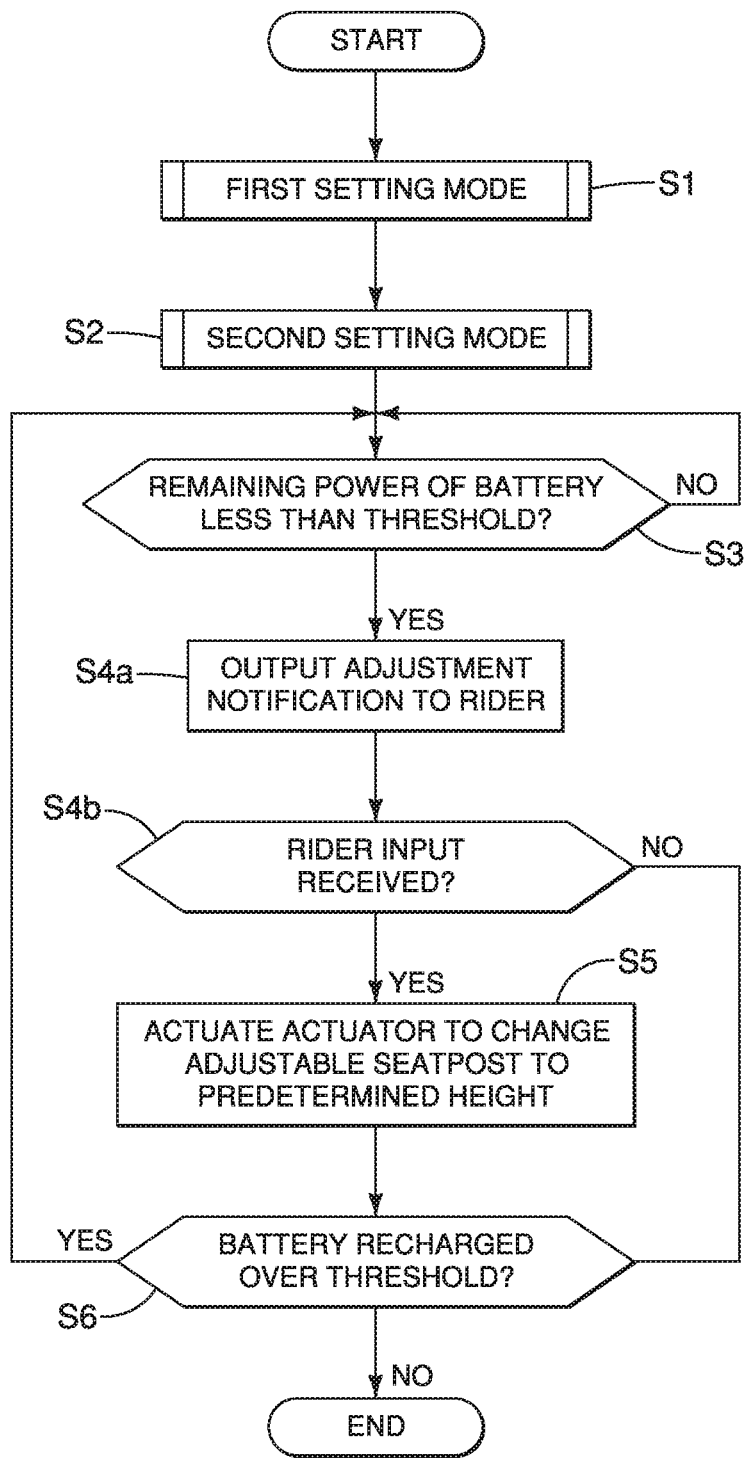
FIG. 14 is a flowchart showing a control process executed by the electronic controller of the bicycle control system for notifying a rider that the battery is below the threshold and changing the seatpost height of the height adjustable seatpost illustrated in FIGS. 6 to 9 to the predetermined seatpost height upon the rider inputting an acceptance to the change in the seatpost height of the height adjustable seatpost.

Referring to FIG. 14, a second low battery seat height mode that is a different embodiment from the first low battery seat height mode will now be discussed. Using the user interface 34, the user or rider can select whether the electronic controller 22 will execute the second low battery seat height mode during riding. If the second low battery seat height mode is set run during riding, then the electronic controller 22 will execute the process of FIG. 14 at a prescribed interval. Basically, in the process of FIG. 14, the electronic controller 22 is configured to automatically control the electric indicator 24 upon determining an amount related to a remaining power of the battery 28 has reached a threshold. Here, the electronic controller 22 first controls the electric indicator 24 to notify the user upon determining the remaining power of the battery 28 reaching the threshold and then controls the electric actuator 26 upon determining a user input accepting the change in the height of the height adjustable seatpost SR The process of FIG. 14 is the same as the process of FIG. 13, except that step S4 of the process of FIG. 13 has been replaced with steps S4*a* and S4*b*.

In step S4*a*, the electronic controller 23 notify the user using the electric indicator 24 such as using the speaker 32 to output an audible sound and then proceeds to step S4*b*. Preferably, the electronic controller 22 is configured to control the electric indicator 24 in at least one of a continuous manner and an intermittent manner until a user input is received to change the height of the height adjustable seatpost SP in the next step S4*b*. Alternatively, the electronic controller 22 outputs the urging signal for a predetermined time period and then proceed to step S4*b*.

In step S4*b*, a user can select whether the electronic controller 22 actuates the electric actuator 26. In other words, the user can notice that the battery 28 is running low and can be urged to select to change the height of the height adjustable seatpost SP or not. If the user inputs a command to stop the urging signal, then the electric actuator 26 does nothing and the process proceeds to step S6. If the user enters an input to change the height of the height adjustable seatpost SP, then the process proceeds to step S5. If the user does nothing, then the electronic controller 22 will either automatically decline the change in the height of the height adjustable seatpost SP based on a factory default setting.

Figure 15:
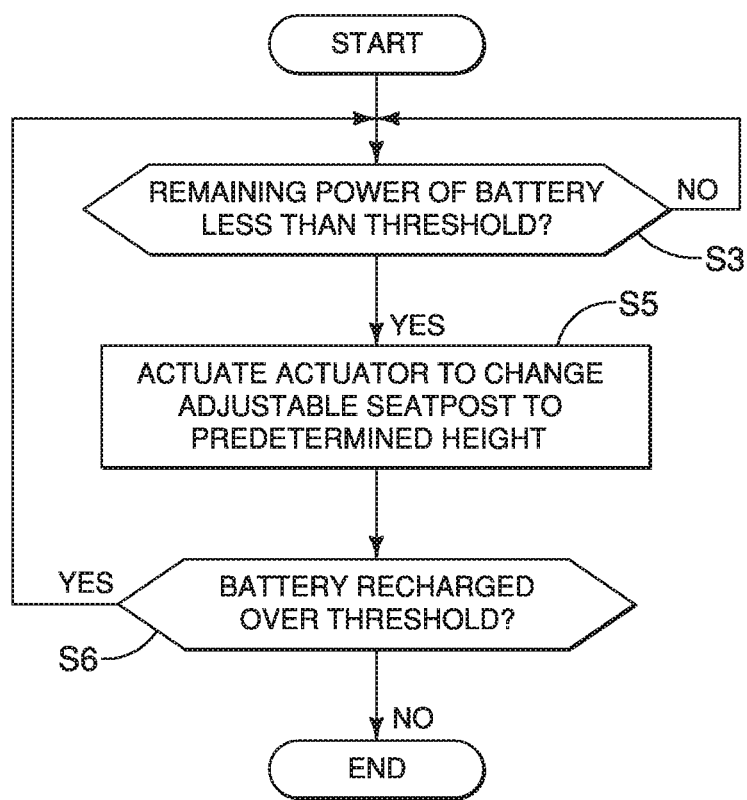
FIG. 15 is a flowchart showing a control process executed by the electronic controller of the bicycle control system for automatically changing the seatpost height of the height adjustable seatpost illustrated in FIGS. 6 to 9 to a predetermined seatpost height upon determining the battery is below the threshold.

Referring to FIG. 15, a third low battery seat height mode that is a different embodiment from the first and second low battery seat height mode will now be discussed. Using the user interface 34, the user or rider can select whether the electronic controller 22 will execute the third low battery seat height mode during riding. If the third low battery seat height mode is set run during riding, then the electronic controller 22 will execute the process of FIG. 15 at a prescribed interval. Basically, in the process of FIG. 15, the electronic controller 22 is configured to automatically control the electric actuator 26 upon determining an amount related to a remaining power of the battery 28 has reached a threshold. The process of FIG. 15 is the same as the process of FIG. 13, except that steps S1, S2 and S4 of the process of FIG. 13 has been omitted.

Figure 16:
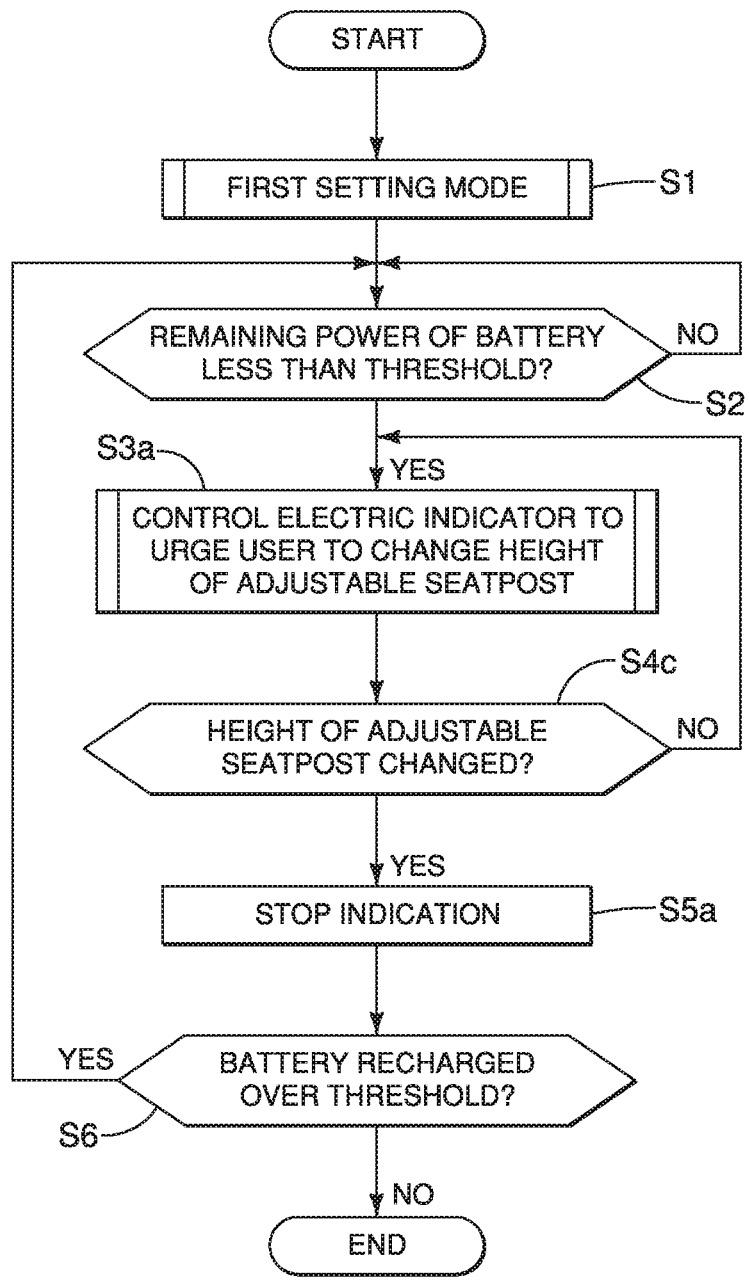
FIG. 16 is a flowchart showing a control process executed by the electronic controller of the bicycle control system for urging the rider to manually change the height adjustable seatpost illustrated in FIGS. 6 to 9 to a desired seatpost height.

Referring to FIG. 16, a fourth low battery seat height mode that is a different embodiment from the first to third low battery seat height mode will now be discussed. Using the user interface 34, the user or rider can select whether the electronic controller 22 will execute the fourth low battery seat height mode during riding. If the fourth low battery seat height mode is set run during riding, then the electronic controller 22 will execute the process of FIG. 16 at a prescribed interval. Basically, in the process of FIG. 16, the electronic controller 22 is configured to urge the user to manually control the electric actuator 26 upon determining an amount related to a remaining power of the battery 28 has reached a threshold. The process of FIG. 16 is the same as the process of FIG. 13, except that step S2 of the process of FIG. 13 has been omitted and steps S3, S4 and S5 of the process of FIG. 13 have been replaced with steps S1*a*, S4*c* and S5*a*.

In step S3*a*, the electronic controller 22 is configured to control the electric indicator 24 to urge the user to manually control the electric actuator 26 upon determining an amount related to a remaining power of the battery 28 has reached a threshold. In particular, the electronic controller 23 notifies the user using the electric indicator 24 such as using the speaker 32 to output an audible sound. After outputting the notification, the process proceeds to step S4*c* where the electronic controller 22 uses the position sensor 54 to checks if the height of the height adjustable seatpost SP has been manually adjusted by the user using one of the operating devices OD1 or OD2. In this way, preferably, the electronic controller 22 is configured to control the electric indicator 24 in at least one of a continuous manner and an intermittent manner until a user input to change the height of the height adjustable seatpost SP is received. Preferably, the electronic controller 22 is configured to control the electric indicator 24 to urge a user to adjust the height of the seat of the height adjustable seatpost SP to a proposed state of the height adjustable seatpost SP that is indicated by the electric indicator 24. For example, the electronic controller 22 can display an up arrow to indicate that the height of the height adjustable seatpost SP should be increase by the user, and a down arrow to indicate that the height of the height adjustable seatpost SP should be decrease by the user.

Once the height of the height adjustable seatpost SP has been manually adjusted by the user using one of the operating devices OD1 or OD2, the process proceeds to step S5*a* where the electronic controller 22 where the notification (indication) is stopped. Then the process proceeds to step S6.

As seen in FIGS. 17 to 20, the height adjustable seatpost SP can be replaced with a height adjustable seatpost SP' for adjusting a seat height of the bicycle seat S with respect to the main bicycle frame MF. The height adjustable seatpost SP can use either the control process of FIG. 16, as discussed above, or the control process of the FIG. 21, as discussed below. The height adjustable seatpost SP' is controlled by the electronic controller 22 as explained below.

The height adjustable seatpost SP' uses internal pressures of gases and/or fluids to control the height of the height adjustable seatpost SP'. Here, the rider pushes down on the bicycle seat S to lower the height of the height adjustable seatpost SP'. On the other hand, the rider removes his or her weight from the bicycle seat S to raise the height of the height adjustable seatpost SP'. The height adjustable seatpost SP' basically includes an electric actuator 26', an inner (first) tube 40', an outer (second) tube 42' and a height adjustment device 44'.

Figure 17:
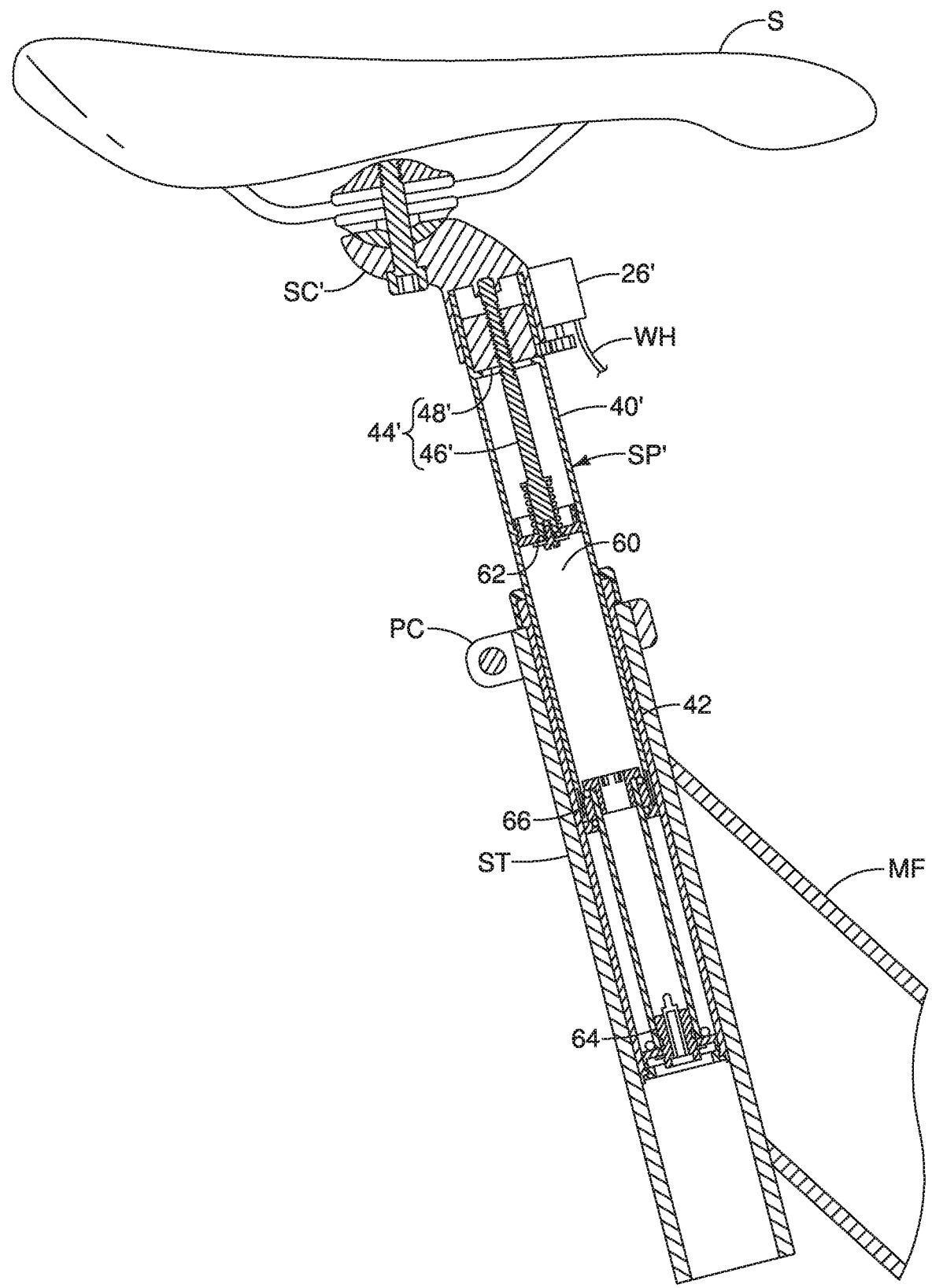
FIG. 17 is an enlarged longitudinal cross-sectional view of a portion of the bicycle illustrated in FIG. 1 that is equipped with a height adjustable seatpost in accordance with another embodiment.
Figure 18:
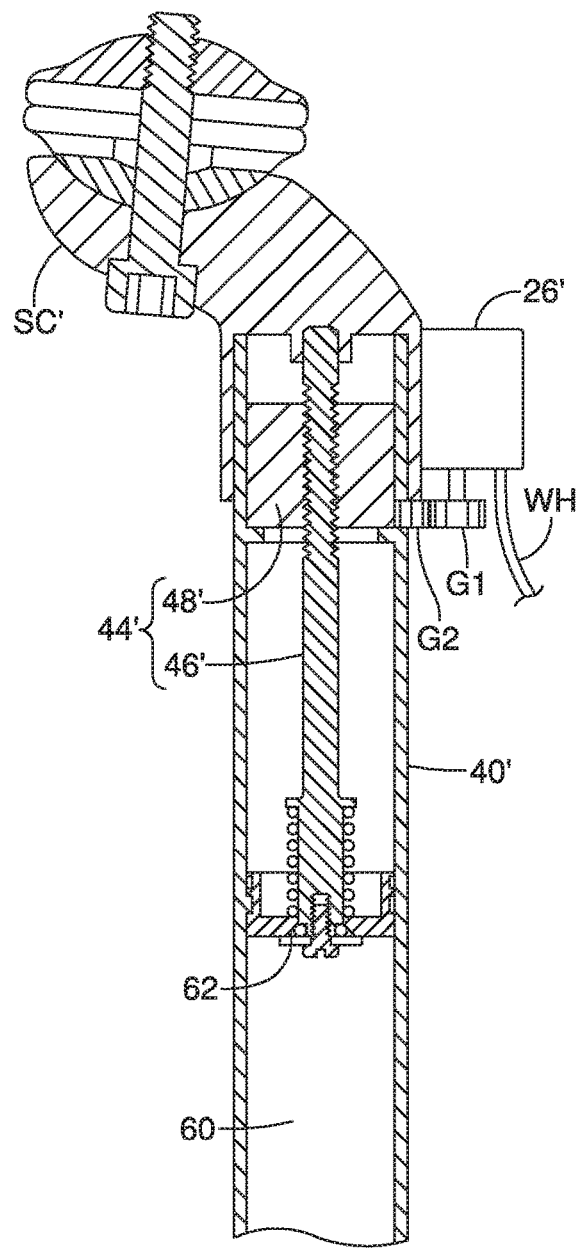
FIG. 18 is an enlarged longitudinal cross-sectional view of an upper portion of the height adjustable seatpost illustrated in FIG. 17 in which a fluid port of a fluid passage is closed to establish a selected height of the height adjustable seatpost.
Figure 19:
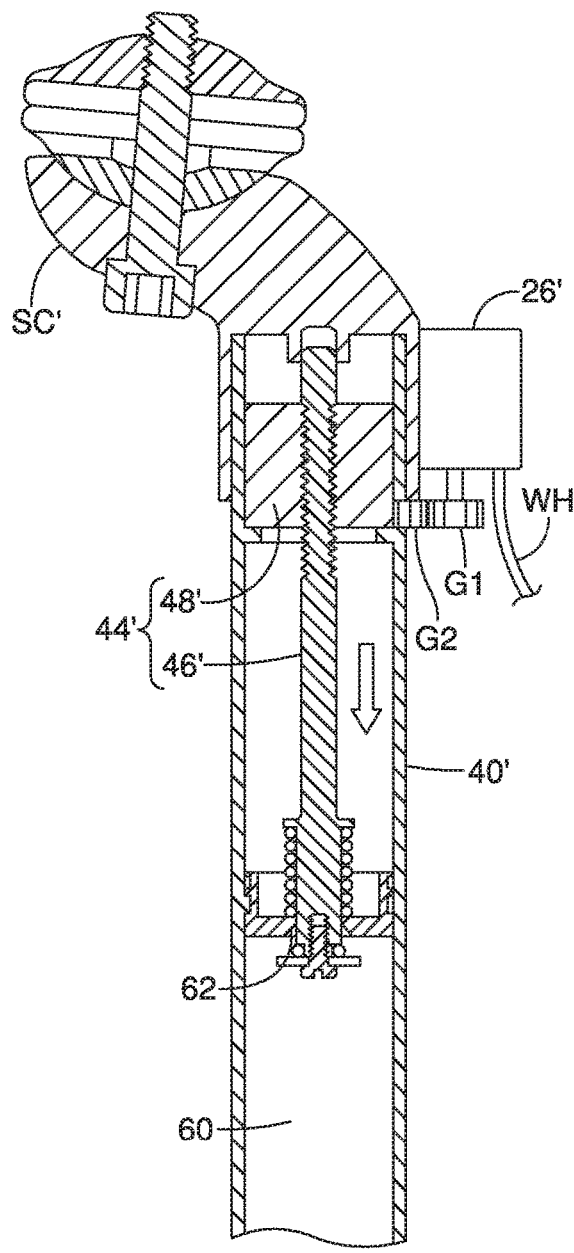
FIG. 19 is an enlarged longitudinal cross-sectional view of an upper portion of the height adjustable seatpost illustrated in FIGS. 17 and 18, but in which the fluid port of the fluid passage has been opened to permit adjustment of the height of the adjustable seatpost.
Figure 20:
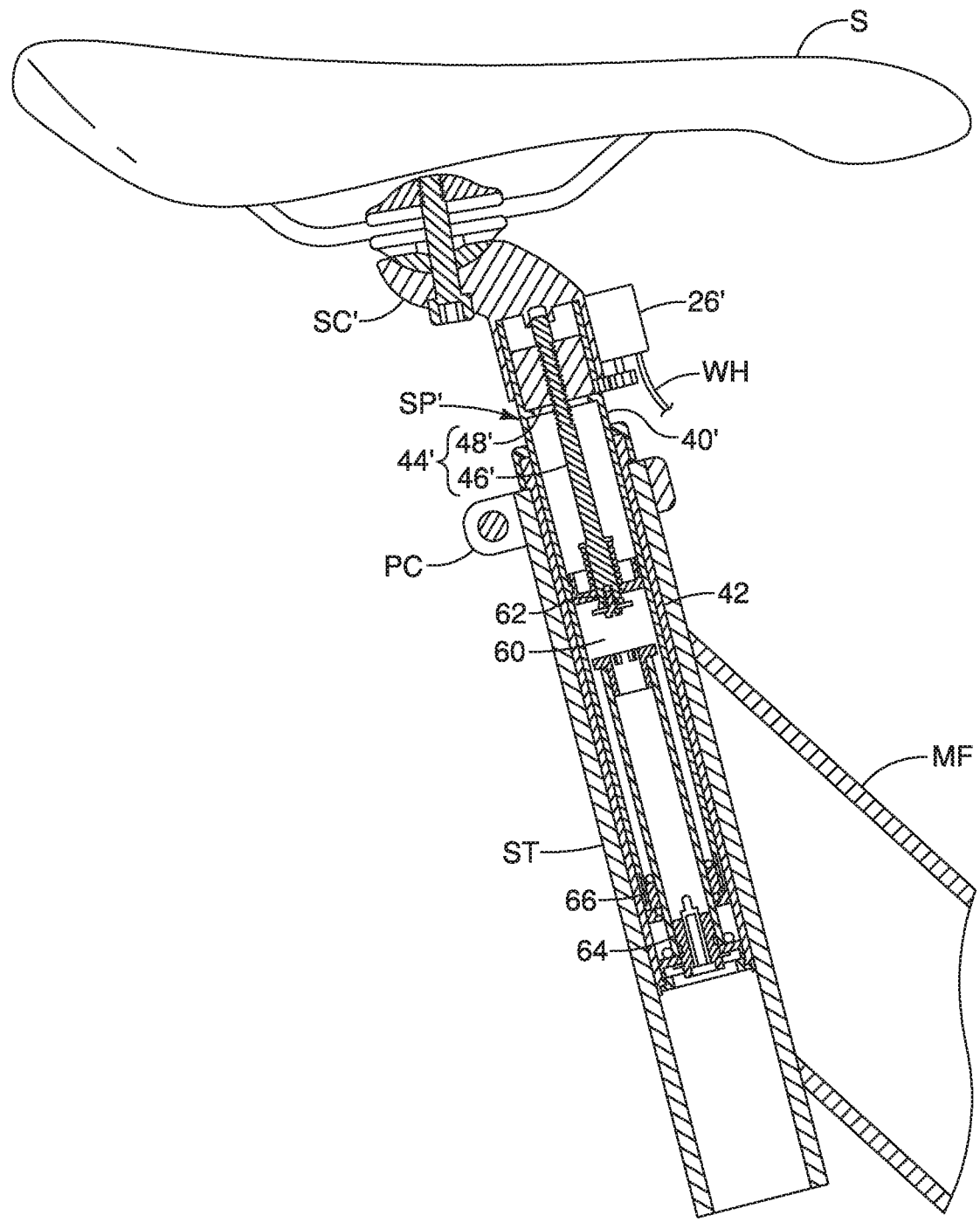
FIG. 20 is an enlarged longitudinal cross-sectional view of the portion of the bicycle illustrated in FIG. 17 in which the height adjustable seatpost has been lowered by a user pushing down on height adjustable seatpost while the fluid port of the fluid passage was opened as illustrated in FIG. 19.

In general, the inner and outer tubes 40' and 42' are telescopically arranged, with the amount of insertion of the inner tube 40' into the outer tube 42' being adjustable. Thus, the inner and outer tubes 40' and 42' concentrically arranged as seen in the illustrated embodiment as seen in FIG. 17. In the illustrated embodiment, the inner and outer tubes 40' and 42' are a separate unit from the main bicycle frame MF such that the outer tube 42' is easily installed into the seat tube ST of the main bicycle frame MF as seen in FIGS. 17 and 20. The inner tube 40' has a seat clamp SC' on its upper end for attaching the seat S in a conventional manner. The outer tube 42' is secured to the seat tube ST of the main bicycle frame MF by the conventional clamping arrangement PC that is provided on the upper end of the seat tube ST. The height adjustment device 44' basically unlocks to the inner and outer tubes 40' and 42' so that the inner tube 40' can be selectively extended (raised) and retracted (lowered) with respect to the outer tube 42' by the user, based on a motor control signal from an operating switch of one of the operating devices OD1 and OD2 via the electronic controller 22.

Similar to the electric actuator 26, the electric actuator 26' of the height adjustable seatpost SP' basically includes a motor, a gear reduction unit and a position sensor. In the illustrated embodiment, the height adjustment device 44' mainly includes a drive screw 46' and a screw nut 48'. Here, the electric actuator 26' turns the screw nut 48' to move the drive screw 46' in a linear manner. Here, the output shaft of the motor of the electric actuator 26' has a gear G1 that is engaged with a fan gear G2 of the screw nut 48'. Thus, when the motor of the electric actuator 26' is actuated, the gear G1 rotates the screw nut 48' via the fan gear G2. This rotation of the screw nut 48' causes the drive screw 46' to allow the inner tube 40' to slide with respect to the outer tube 42'.

In particular, the height adjustment device 44 uses internal pressures of gases and/or fluids within the inner and outer tubes 40' and 42' to control the height or position of the inner and outer tubes 40' and 42' relative to one another. In this manner, the height of the bicycle seat S can be controlled. More specifically, the inner and outer tubes 40' and 42' are filled with gases and/or fluids. The inner tube 40' has a fluid passage 60 divided into an upper section and a lower section with a fluid port 62 interconnecting the upper and lower sections of the fluid passage 60. The lower end of the outer tube 42' is closed off and has a piston 64 extending upwardly into the inner tube 40'. The lower end of the inner tube 40' has a bulkhead 62 that is slidably disposed on the piston 64.

The electronic controller 22 is configured to actuate the electric actuator 26 to open the fluid port 62 of the fluid passage 60. Specifically, when the motor of the electric actuator 26' is actuated, the gear G1 rotates the screw nut 48' via the fan gear G2. This rotation of the screw nut 48 causes the drive screw 46' to move linearly the drive screw 46' to open the fluid port 62 of the fluid passage 60. With the fluid port 62 open, now, the user can change the height of the height adjustable seatpost SP' to increase the height by removing his or her weight from the bicycle seat S, or decrease the height by pushing down on the bicycle seat S.

Figure 21:
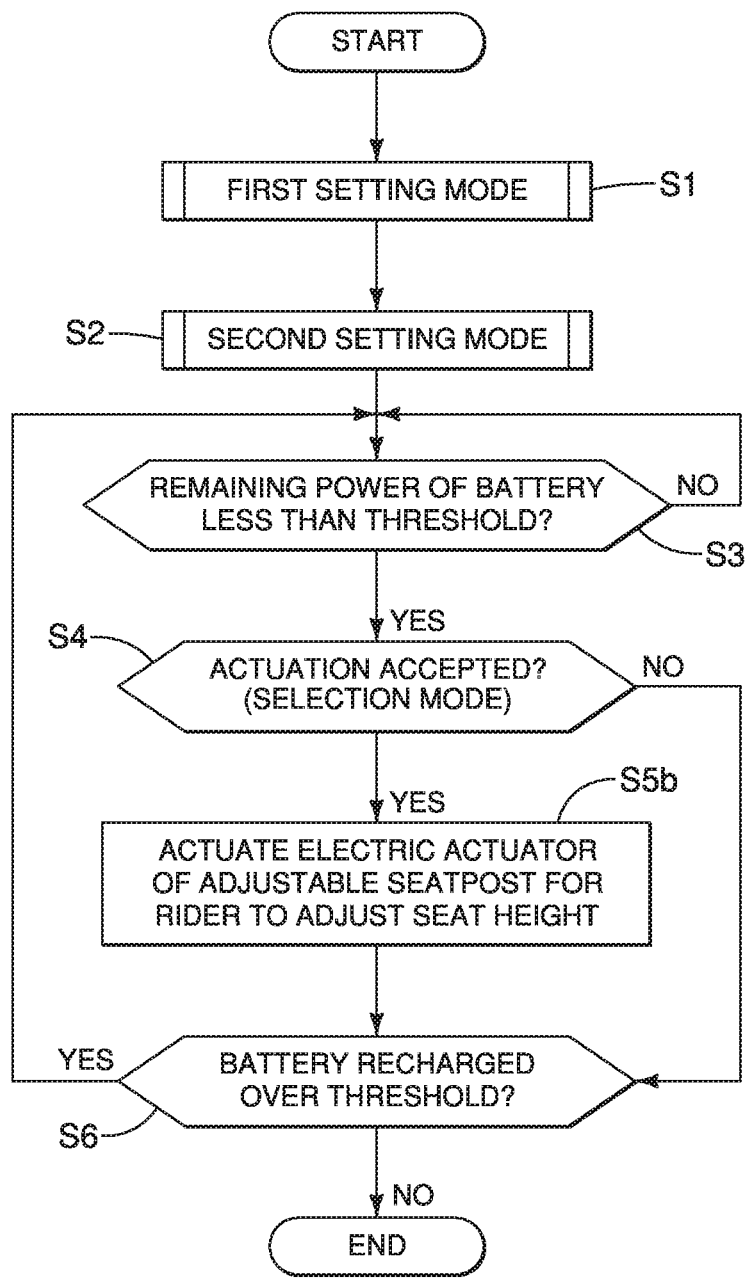
FIG. 21 is a flowchart showing a control process executed by the electronic controller of the bicycle control system for notifying a rider that the battery is below the threshold and urging the rider to change the seatpost height of the height adjustable seatpost illustrated in FIGS. 17 to 20 to a desired seatpost height.

Referring to FIG. 21, a fifth low battery seat height mode that is a different embodiment from the first to fourth low battery seat height mode will now be discussed that is used with the height adjustable seatpost SP'. Using the user interface 34, the user or rider can select whether the electronic controller 22 will execute the fifth low battery seat height mode during riding. If the fifth low battery seat height mode is set run during riding, then the electronic controller 22 will execute the process of FIG. 21 at a prescribed interval. Basically, in the process of FIG. 21, the electronic controller 22 is configured to urge the user to manually control the electric actuator 26' upon determining an amount related to a remaining power of the battery 28 has reached a threshold. The process of FIG. 21 is the same as the process of FIG. 13, except that step S5 of the process of FIG. 13 has been replaced with step S5*b*.

In step S5*b*, the electronic controller 22 actuates the electric actuator 26' to open the fluid port 62 of the fluid passage 60. Now, with the fluid port 62 open, the user can change the height of the height adjustable seatpost SP' to increase or decrease the height by their own control. During step S5*b*, the electronic controller 22 can also be configured to control the electric indicator 24 to urge a user to adjust the height of the seat of the height adjustable seatpost SP' to a proposed state of the height adjustable seatpost SP' that is indicated by the electric indicator 24'. For example, while the fluid port 62 is open, the electronic controller 22 can display an up arrow to indicate that the height of the height adjustable seatpost SP' should be increase by the user, and a down arrow to indicate that the height of the height adjustable seatpost SP should be decrease by the user. The electronic controller 22 is configured to not control the electric indicator 24 to urge the user anymore in accordance with the condition of the battery 28 after the change of the height of the height adjustable seatpost SP' unless the electronic controller 22 determines the battery 28 is charged over a reset threshold. In other words, after the user change of the height of the height adjustable seatpost SP', the electronic controller 22 does not control the electric indicator to urge the user in accordance with the condition of the battery 28.

Figure 22:
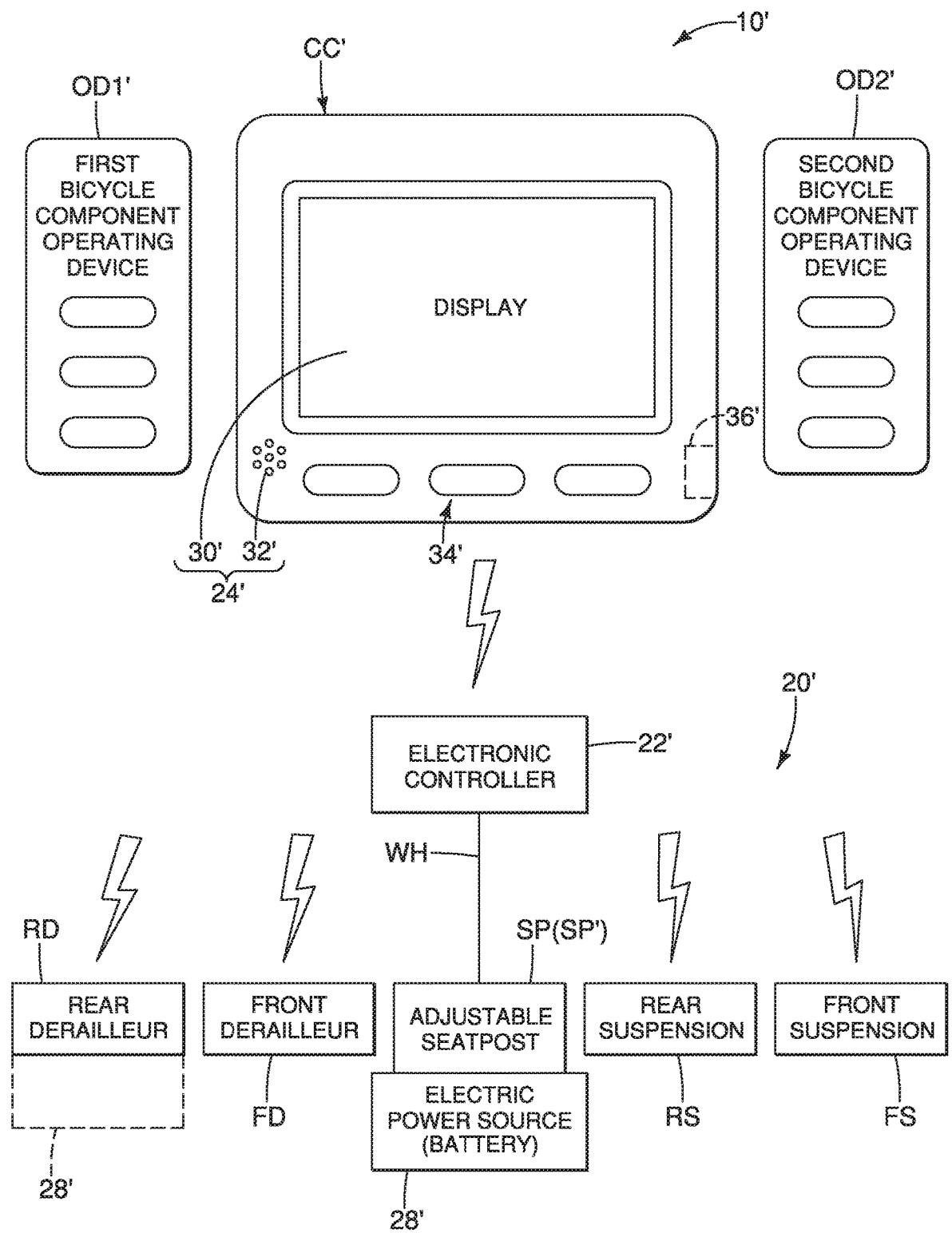
FIG. 22 is a schematic block diagram showing an entire configuration of a bicycle control system in accordance with another embodiment.

Referring to FIG. 22, a bicycle electric component system 10' in accordance with another embodiment is illustrated for use with the bicycle electrical components CC', SP or SP', FS, RS, FD and RD. The bicycle electric component system 10' includes a bicycle control system 20' comprises an electronic controller 22'. Here, the electronic controller 22' is not a part of the bicycle computer CC, but rather wirelessly communicates with at least one of a bicycle computer CC', a first operating device OD1' and a second operating device OD2'. The bicycle computer CC' includes an electric indicator 24' that includes a display 30' and a speaker 32' similar to the first embodiment. The electronic controller 22' is configured to control at least one of the electric indicator 24' and an electric actuator of the height adjustable seatpost SP in accordance with a condition of a battery 28' to supply electricity to the electric actuator 26 or 26' of the height adjustable seatpost SP or SP'.

Here, the battery 28' is configured to be detachably and selectively connected to one of the height adjustable seatpost SP or SP' and a bicycle electric component other than the height adjustable seatpost SP or SP' (see the battery 28' shown in dashed lines on the rear derailleur as seen in FIG. 22. The battery 28' can be retained to either one of the height adjustable seatpost SP or SP' and a bicycle electric component other than the height adjustable seatpost SP or SP' using any conventional fastener that permits the battery 28' removed and reinstalled without damage to the battery or the bicycle electric component and without disassembling the bicycle electric component.

As seen in FIG. 22, the bicycle electrical components CC', SP or SP', FS, RS, FD and RD communicate uses wireless communication devices or dedicates signal lines can be used to communicate between the bicycle electrical components CC', SP or SP', FS, RS, FD and RD.

In view of the similarities between the bicycle electric component system 10' and the bicycle electric component system 10, the bicycle electric component system 10' will not be discussed in further detail.

In understanding the scope of the present invention, the term "comprising," and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control system. Accordingly, these directional terms, as utilized to describe the bicycle control system should be interpreted relative to a bicycle in an upright riding position on a horizontal surface and that is equipped with the bicycle control system. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control system comprising:
    an electronic controller configured to automatically control at least one of an electric indicator and an electric actuator of a height adjustable seatpost in accordance with a condition of a battery to supply electricity to the electric actuator,
    wherein the controller actuates the electric actuator in accordance with the condition of the battery, and the controller controls the electric indicator to indicate the electric actuator would be actuated before the electric actuator is actuated in accordance with the condition of the battery so as to control the electric indicator to indicate a movement direction of the height adjustable seatpost.

2. The bicycle control system according to claim 1, wherein
    the electronic controller is configured to output a signal related to a changing operation of a height of the height adjustable seatpost in accordance with an amount related to a remaining power of the battery.

3. The bicycle control system according to claim 1, wherein
    the electronic controller is configured to automatically control the at: least one of the electric indicator and the electric actuator upon determining an amount related to a remaining power of the battery has reached a threshold.

4. The bicycle control system according to claim 3, wherein
    the electronic controller is configured to set a first setting mode in which a user can set the threshold.

5. The bicycle control system according to claim 3, wherein
    the threshold is set to a value correspond to the condition of the battery where the value is less than 20% of fully charged condition.

6. The bicycle control system according to claim 1, wherein
    the electronic controller is configured to actuate the electric actuator of the height adjustable seatpost, and
    the electronic controller is configured to enter a selection mode, in which a user input selects whether the electronic controller actuates the electric actuator, upon determining a value related to a remaining power of the battery reached a threshold.

7. The bicycle control system according to claim 6, wherein
    the electronic controller is configured to actuate the electric actuator only upon receiving the user input to accept an actuation of the electric actuator in the selection mode.

8. The bicycle control system according to claim 6, wherein
    the electronic controller is configured to not actuate the electric actuator anymore in accordance with the condition of the battery after the selection of the user unless the electronic controller determines that the battery is charged over a reset threshold.

9. The bicycle control system according to claim 1, wherein
the electronic controller is configured to actuate the electric actuator to open a fluid port of a fluid passage.

10. The bicycle control system according to claim 1, wherein
the electronic controller is configured to actuate the electric actuator to adjust the height of the height adjustable seatpost to a predetermined height.

11. The bicycle control system according to claim 10, wherein
the electronic controller is configured to set a second setting mode in which a user can set the predetermined height.

12. The bicycle control system according to claim 10, wherein
the electronic controller is configured to set the predetermined height to an intermediate height between a maximum height of the height adjustable seatpost and a minimum height of the height adjustable seatpost.

13. The bicycle control system according to claim 1, wherein
the electronic controller is configured to not actuate the actuator in accordance with the condition of the battery anymore after the electric actuator is actuated unless the battery is charged over a reset threshold.

14. The bicycle control system according to claim 1, wherein
the electronic controller is configured to control the electric indicator to urge a user to adjust the height of the seat of the height adjustable seatpost to a proposed state of the height adjustable seatpost that is indicated by the electric indicator.

15. The bicycle control system according to claim 14, wherein
the electronic controller is configured to control the electric indicator in at least one of a continuous manner and an intermittent manner until a user input to change the height of the height adjustable seatpost is received.

16. The bicycle control system according to claim 14, wherein
the electronic controller is configured to not control the electric indicator to urge the user anymore in accordance with the condition of the battery after the change of the height of the height adjustable seatpost unless the electronic controller determines the battery is charged over a reset threshold.

17. The bicycle control system according to claim 1, wherein
the battery is configured to supply electricity to another bicycle electric component.

18. The bicycle control system according to claim 17, wherein
the battery is configured to be detachably and selectively connected to one of the height adjustable seatpost and a bicycle electric component other than the height adjustable seatpost.

* * * * *